(12) United States Patent
Nozaki et al.

(10) Patent No.: US 12,233,987 B2
(45) Date of Patent: Feb. 25, 2025

(54) HUMAN-POWERED VEHICLE CONTROL SYSTEM AND HUMAN-POWERED VEHICLE TRANSMISSION DEVICE

(71) Applicant: SHIMANO INC., Sakai (JP)

(72) Inventors: Akihiro Nozaki, Sakai (JP); Hiroko Matsubayashi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/443,205

(22) Filed: Feb. 15, 2024

(65) Prior Publication Data
US 2024/0294228 A1    Sep. 5, 2024

(30) Foreign Application Priority Data
Mar. 1, 2023  (JP) .................. 2023-030817

(51) Int. Cl.
| | | |
|---|---|---|
| *B62M 9/122* | (2010.01) | |
| *B62J 43/30* | (2020.01) | |
| *B62M 6/45* | (2010.01) | |
| *B62M 6/55* | (2010.01) | |
| *B62M 6/90* | (2010.01) | |
| *B62M 25/08* | (2006.01) | |
| *B62J 50/22* | (2020.01) | |
| *B62M 9/132* | (2010.01) | |

(52) U.S. Cl.
CPC ............ *B62M 9/122* (2013.01); *B62J 43/30* (2020.02); *B62M 6/45* (2013.01); *B62M 6/55* (2013.01); *B62M 6/90* (2013.01); *B62M 25/08* (2013.01); *B62J 50/22* (2020.02); *B62M 9/132* (2013.01)

(58) Field of Classification Search
CPC ........ B62M 9/122; B62M 9/132; B62M 6/45; B62M 6/55; B62M 6/90; B62M 2025/003; B62M 25/08; B62J 43/30; B62J 43/28; B62J 43/13; B62J 50/22; G06F 3/02
See application file for complete search history.

(56) References Cited

U.S. PATENT DOCUMENTS

| | | | |
|---|---|---|---|
| 2018/0148127 A1 | 5/2018 | Sato et al. | |
| 2020/0262511 A1* | 8/2020 | Hahn | B60L 3/04 |
| 2020/0377167 A1* | 12/2020 | Suzuki | B62K 25/04 |
| 2021/0155315 A1 | 5/2021 | Hahn et al. | |
| 2022/0001955 A1* | 1/2022 | Fujii | H04W 4/40 |

(Continued)

FOREIGN PATENT DOCUMENTS

JP    2018-89989    6/2018

*Primary Examiner* — Timothy Hannon
(74) *Attorney, Agent, or Firm* — MORI & WARD, LLP

(57) ABSTRACT

A human-powered vehicle control system includes a transmission device and a transmission operation device configured to operate the transmission device. The transmission operation device includes transmission operation controller circuitry configured to transmit a first command to an assist operation device of a human-powered vehicle through wireless communication. The transmission device includes first communicator circuitry, an actuator, and transmission controller circuitry. The first communicator circuitry is configured to receive a first shift command transmitted from the assist operation device in a case where the assist operation device receives the first command. The actuator is configured to perform a shifting action. The transmission controller circuitry is configured to control the actuator so that the actuator performs the shifting action in response to the first shift command.

20 Claims, 8 Drawing Sheets

(56) References Cited

U.S. PATENT DOCUMENTS

| | | | |
|---|---|---|---|
| 2022/0135176 A1 | 5/2022 | Shahana et al. | |
| 2022/0204129 A1 | 6/2022 | Shahana et al. | |
| 2022/0379995 A1* | 12/2022 | Nagata | B62J 43/30 |
| 2023/0242208 A1* | 8/2023 | Numata | B62M 9/122 |
| | | | 180/206.2 |

* cited by examiner

HUMAN-POWERED VEHICLE CONTROL SYSTEM AND HUMAN-POWERED VEHICLE TRANSMISSION DEVICE

CROSS-REFERENCE TO RELATED APPLICATIONS

The present application claims priority to Japanese Patent Application No. 2023-030817 filed Mar. 1, 2023. The contents of Japanese Patent Application No. 2023-030817 are incorporated herein by reference in their entirety.

BACKGROUND

Technical Field

The present disclosure relates to a human-powered vehicle control system and a human-powered vehicle transmission device.

Background Art

Japanese Laid-Open Patent Publication No. 2018-089989 describes one example of a transmission device and a control system for a human-powered vehicle including a transmission operation device that operates a transmission device.

SUMMARY

In accordance with an aspect of the present disclosure, a human-powered vehicle control system includes a transmission device and a transmission operation device configured to operate the transmission device. The transmission operation device includes transmission operation controller circuitry configured to transmit a first command to an assist operation device of a human-powered vehicle through wireless communication. The human-powered vehicle includes an assist unit and the assist operation device. The assist unit is configured to assist in propulsion of the human-powered vehicle. The assist operation device includes an operating unit. The assist operation device is configured to transmit an operation signal to the assist unit through wired communication in a case where the operating unit is operated by a user. The transmission device includes first communicator circuitry, an actuator, and transmission controller circuitry. The first communicator circuitry is configured to receive a first shift command transmitted from the assist operation device in a case where the assist operation device receives the first command. The actuator is configured to perform a shifting action. The transmission controller circuitry is configured to control the actuator so that the actuator performs the shifting action in response to the first shift command.

In accordance with another aspect of the present disclosure, a human-powered vehicle control system includes an assist unit and an assist operation device. The assist unit is configured to assist in propulsion of a human-powered vehicle. The assist operation device includes an operating unit. The assist operation device is configured to transmit an operation signal to the assist unit through wired communication in a case where the operating unit is operated by a user. The assist operation device is configured to transmit a first command to the assist unit. The first command is received from a transmission operation device configured to operate a transmission device. The assist unit includes assist controller circuitry configured to have the assist operation device transmit a first shift command to the transmission device in response to receipt of the first command from the assist operation device so that the transmission device performs a shifting action.

In accordance with another aspect of the present disclosure, a human-powered vehicle transmission device includes communicator circuitry and transmission controller circuitry. The communicator circuitry is configured to communicate with an assist operation device and a transmission operation device. The assist operation device is configured to operate an assist unit configured to assist in propulsion of a human-powered vehicle. The transmission operation device is configured to operate the transmission device. The transmission controller circuitry is configured to control the communicator circuitry in accordance with a communication control state. The transmission controller circuitry is configured to allow the communication control state to be switched from one of a first communication control state and a second communication control state to another of the first communication control state and the second communication control state. The transmission controller circuitry is configured to control the communicator circuitry so that the communicator circuitry communicates with the assist operation device using a first communication protocol in the first communication control state. The transmission controller circuitry is configured to control the communicator circuitry so that the communicator circuitry communicates with the transmission operation device using a second communication protocol in the second communication control state. The second communication protocol differs from the first communication protocol.

EMBODIMENTS OF THE DISCLOSURE

With reference to FIGS. 1 to 8, a control system 60 for a human-powered vehicle and a transmission device 62 for a human-powered vehicle will now be described. The control system 60 can also be referred to as a human-powered vehicle control system 60. The transmission device 62 can also be referred to as a human-powered vehicle transmission device 62. The human-powered vehicle is a vehicle that includes at least one wheel and is driven by at least human driving force. The human-powered vehicle includes, for example, various types of bicycles such as a mountain bike, a road bike, a city bike, a cargo bike, a handcycle, and a recumbent bike. The number of wheels of the human-powered vehicle is not limited. The human-powered vehicle includes, for example, a monocycle and vehicles having two or more wheels. The human-powered vehicle is not limited to a vehicle driven by only human driving force. The human-powered vehicle includes an e-bike that uses not only human driving force but also drive force of an electric motor for propulsion. An e-bike includes an electric assist bicycle that uses an electric motor to assist in propulsion. In the description hereafter, the human-powered vehicle refers to an electric assist bicycle.

Figure 1:
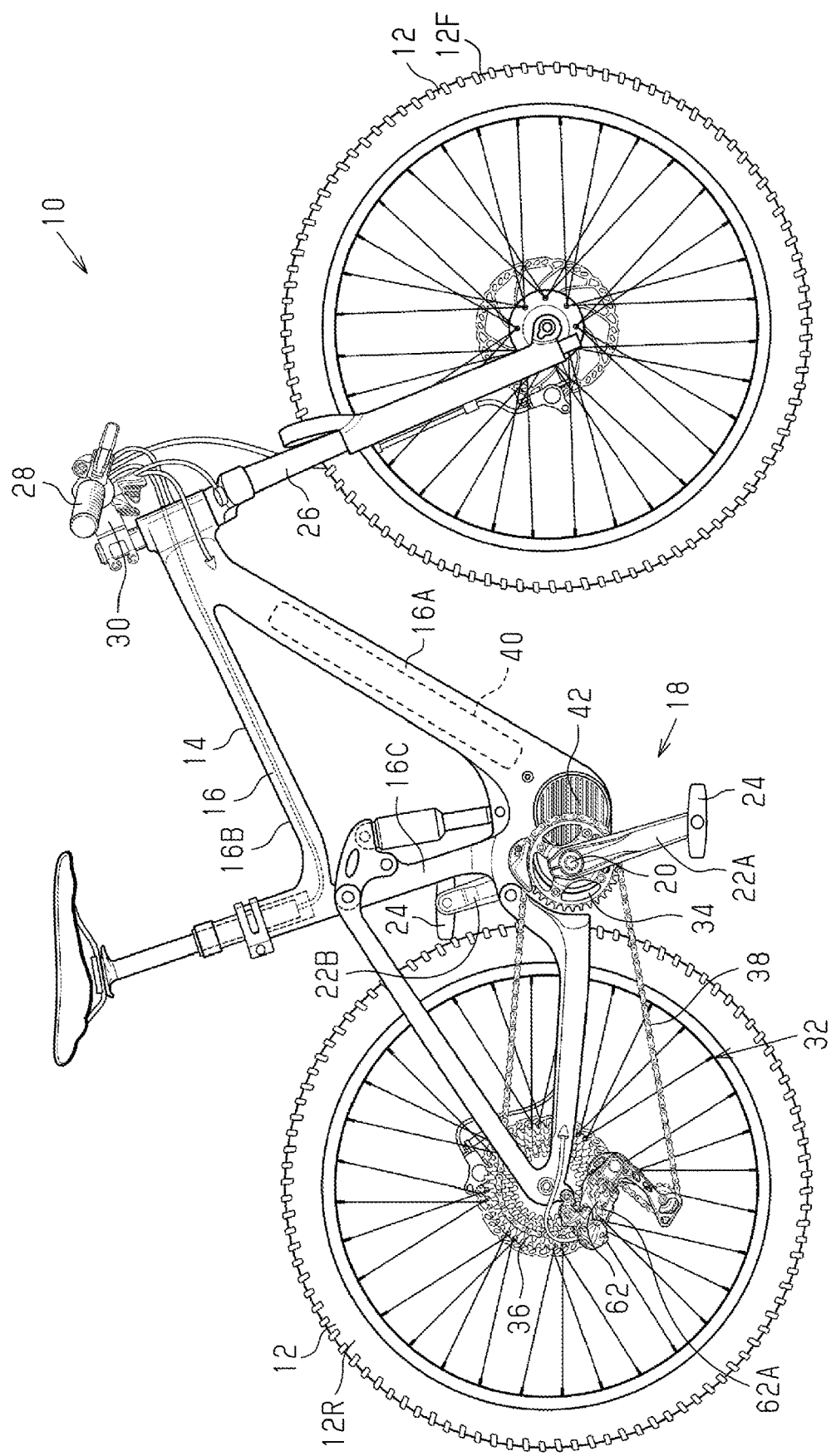
FIG. 1 is a side view of a human-powered vehicle including a control system in accordance with one embodiment.

As shown in FIG. 1, a human-powered vehicle 10 includes wheels 12 and a vehicle body 14. The wheels 12 include a front wheel 12F and a rear wheel 12R. The vehicle body 14 includes a frame 16. The frame 16 includes, for example, a down tube 16A, a top tube 16B, and a seat tube 16C.

The human-powered vehicle 10 further includes a crank 18 that receives, for example, human driving force. The crank 18 includes, for example, a crank axle 20 rotatable relative to the frame 16, a first crank arm 22A, and a second crank arm 22B. The first crank arm 22A is provided on, for example, a first end of the crank axle 20 in the axial direction of the crank axle 20. The second crank arm 22B is provided on, for example, a second end of the crank axle 20 opposite the first end of the crank axle 20. A pedal 24, for example, is connected to each of the first crank arm 22A and the second crank arm 22B.

A front fork 26 is connected to the frame 16. The front wheel 12F is coupled to the front fork 26. A handlebar 28 is coupled to the front fork 26 by a stem 30. The rear wheel 12R is supported by the frame 16.

In the present embodiment, the crank 18 is linked to the rear wheel 12R by a drive mechanism 32. Rotation of the crank axle 20 drives the rear wheel 12R. At least one of the front wheel 12F and the rear wheel 12R can be linked by the drive mechanism 32 to the crank 18. The drive mechanism 32 includes at least one first rotational body 34 coupled to the crank axle 20.

The at least one first rotational body 34 includes, for example, a front sprocket. The at least one first rotational body 34 can include a pulley or a bevel gear. The crank axle 20 can be coupled to the front sprocket by a one-way clutch.

The drive mechanism 32 includes at least one second rotational body 36 and a linking body 38. The linking body 38 is configured to transmit the rotational force of the at least one first rotational body 34 to the at least one second rotational body 36. The linking body 38 includes, for example, a chain. The linking body 38 can include a belt or a shaft.

The at least one second rotational body 36 includes, for example, a rear sprocket. The at least one second rotational body 36 can include a pulley or a bevel gear. The chain is wound around, for example, the front sprocket and the rear sprocket. The at least one second rotational body 36 is coupled to, for example, the rear wheel 12R. The rear wheel 12R is configured to be rotated by, for example, rotation of the at least one second rotational body 36.

The at least one second rotational body 36 is coupled to the rear wheel 12R by, for example, a first one-way clutch. The first one-way clutch includes, for example, at least one of a roller clutch, a sprag clutch, and a ratchet clutch. The first one-way clutch is configured to transmit driving force from the at least one second rotational body 36 to the rear wheel 12R in a case where forward rotation of the at least one first rotational body 34 rotates the at least one second rotational body 36. The first one-way clutch permits relative rotation of the rear wheel 12R and the at least one second rotational body 36 in a case where the forward rotation speed of the rear wheel 12R is higher than the forward rotation speed of the at least one second rotational body 36.

The human-powered vehicle 10 further includes, for example, a battery 40. The battery 40 includes one or more battery elements. The battery elements include rechargeable batteries. The battery 40 is configured to supply electric components of the human-powered vehicle 10 with electric power. The battery 40 is configured to supply electric power to, for example, an assist unit 42 and the transmission device 62. The battery 40 is connected by, for example, power line communication (PLC), Controller Area Network (CAN), or Universal Asynchronous Receiver-Transmitter (UART) to the assist unit 42 in a manner allowing for communication. The battery 40 can be configured to perform communication with an assist operation device 44 through, for example, power line communication (PLC), CAN, or UART. The battery 40 is, for example, connected by a power cable 40A to the transmission device 62. The cable used for communication between the battery 40 and the assist unit 42 can be the power cable 40A or a different cable. In a case where the power cable 40A is used for communication between the battery 40 and the assist unit 42, the power cable 40A is, for example, a power communication line.

The battery 40 is provided, for example, on the frame 16. The battery 40 is, for example, incorporated in the frame 16. The battery 40 is, for example, incorporated in the down tube 16A. The battery 40 can be incorporated in the top tube 16B or the seat tube 16C. The battery 40 can be accommodated inside the frame or in a battery housing attached to the outer surface of the frame 16. In a case where the battery 40 includes a plurality of battery elements, the battery 40 can be located at a number of locations so that the battery elements are located at different positions.

Figure 2:
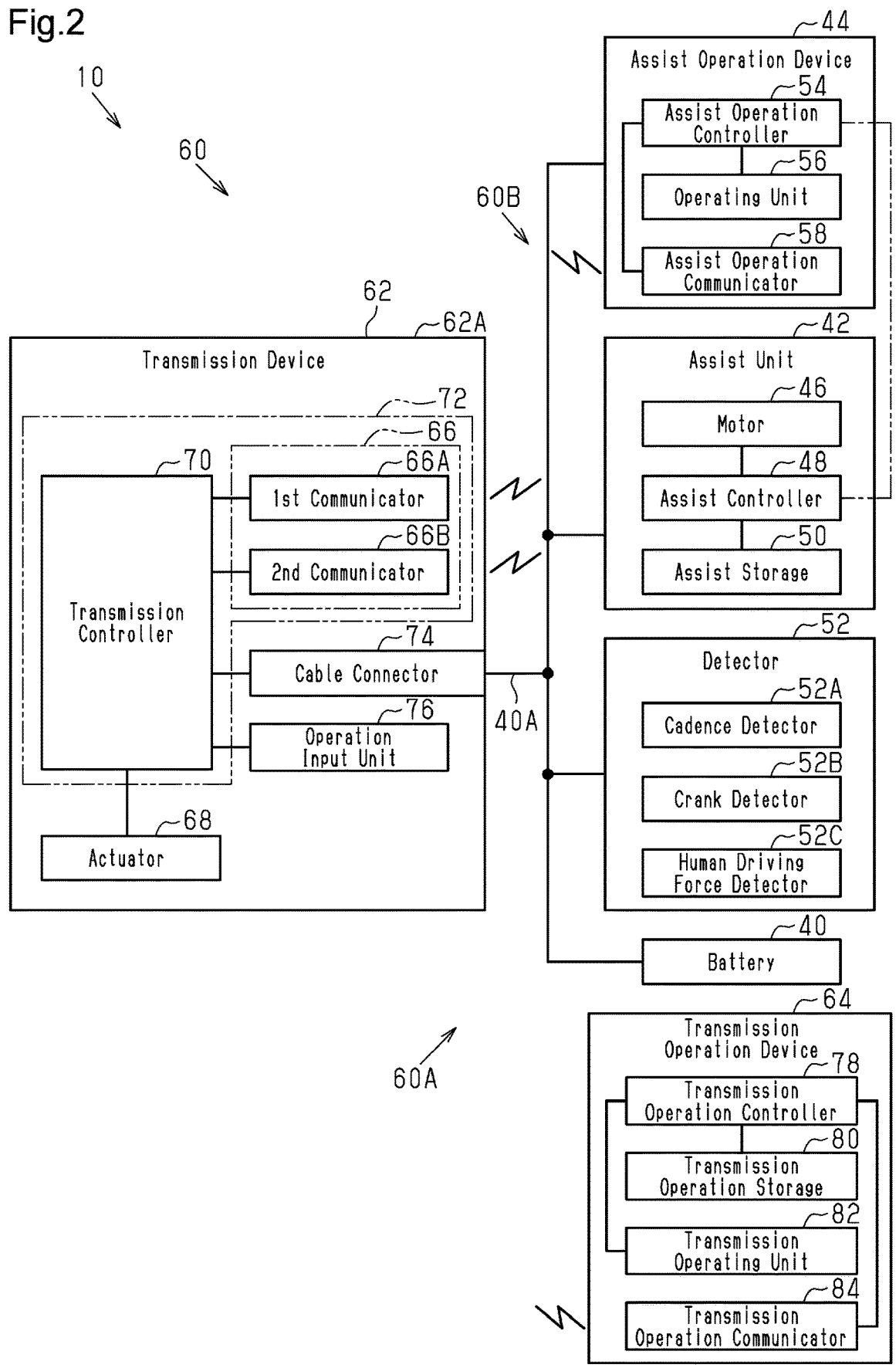
FIG. 2 is a block diagram showing the electrical configuration of the human-powered vehicle illustrated in FIG. 1.

As shown in FIGS. 1 and 2, the human-powered vehicle 10 includes the assist unit 42 and the assist operation device 44. The assist unit 42 is configured to assist in propulsion of the human-powered vehicle 10. The assist unit 42 includes, for example, a motor 46. The motor 46 is configured to transmit driving force to the drive mechanism 32. The motor 46 generates rotation when supplied with electric power from the battery 40. In the present embodiment, the motor 46 transmits driving force to the first rotational body 34. The assist unit 42 assists in propulsion of the human-powered vehicle 10 as the motor 46 transmits driving force to the drive mechanism 32. The motor 46 can be configured to transmit driving force to the front wheel 12F or the rear wheel 12R.

The assist unit 42 includes, for example, an assist controller 48. The assist controller 48 includes, for example, at least one processor that executes predetermined control programs. The at least one processor of the assist controller 48 includes, for example, a central processing unit (CPU) or a micro-processing unit (MPU). The at least one processor of the assist controller 48 can be arranged at separate locations. Part of the at least one processor can be provided on the human-powered vehicle 10, and another part of the at least one processor can be provided in a server connected to the internet. In a case where the at least one processor is arranged at separate locations, parts of the at least one processor can communicate with one another through a wireless communication device. The assist controller 48 can include one or more microcomputers. The assist controller 48 can also be referred to as assist controller circuitry 48.

The assist unit 42 includes an assist storage 50. The assist storage 50 is connected to, for example, the assist controller 48 in a manner allowing for wired or wireless communication. The assist storage 50 stores, for example, control programs and information used in control processes. The assist storage 50 includes, for example, a nonvolatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The volatile memory includes, for example, a random access memory (RAM). The assist storage 50 can also be referred to as assist storage circuitry 50.

The human-powered vehicle 10 includes, for example, a detector 52. The detector 52 detects the state of the human-powered vehicle 10. The detector 52 is connected to at least one of the assist unit 42 and the assist operation device 44 in a manner allowing for wired or wireless communication. The detector 52 sends a detection signal to at least one of the assist unit 42 and the assist operation device 44. The assist controller 48 is configured to control the motor 46 based on, for example, the detection signal from the detector 52.

The detector 52 includes, for example, a cadence detector 52A. The cadence detector 52A is configured to detect, for example, information related to the cadence of the human-powered vehicle 10. The cadence detector 52A is configured to detect, for example, information related to the rotation speed of a wheel 12. The cadence detector 52A is provided on, for example, the frame 16 to detect the magnetic force of a magnet attached to at least one of the front wheel 12F and the rear wheel 12R.

The cadence detector 52A is configured to send, for example, a detection signal to the assist controller 48 a predetermined number of times during a single rotation of the wheel 12. The predetermined number of times is, for example, once. The assist controller 48 is configured to calculate the cadence of the human-powered vehicle 10 based on the number of times the detection signal is received from the cadence detector 52A during a predetermined period. The assist controller 48 can be configured to calculate the vehicle speed of the human-powered vehicle 10 from the cadence of the human-powered vehicle 10 and information related to the circumferential length of the wheels 12.

The detector 52 includes, for example, a crank detector 52B. The crank detector 52B detects, for example, the crank angle of the crank 18. The crank angle of the crank 18 is, for example, the angle of the crank 18 from where one of the first crank arm 22A and the second crank arm 22B is located at the top dead center and the other one of the first crank arm 22A and the second crank arm 22B is located at the bottom dead center. For example, from a state in which the first crank arm 22A is located at the top dead center, the crank angle will be 180 degrees in a case where the first crank arm 22A is rotated to the bottom dead center.

The crank detector 52B is configured to send, for example, information corresponding to at least one of the rotational speed of the crank axle 20 and the rotational speed of the at least one first rotational body 34 to the assist controller 48. Information corresponding to the rotational speed of the crank axle 20 includes, for example, angular velocity of the crank axle 20. Information corresponding to the rotational speed of the at least one first rotational body 34 includes, for example, angular velocity of the at least one first rotational body 34.

The crank detector 52B is configured to send, for example, a signal corresponding to the rotational speed of the crank axle 20 and the rotational speed of the at least one first rotational body 34 to the assist controller 48. The crank detector 52B is configured to send, for example, a detection signal corresponding to the rotational angle of at least one of the crank axle 20 and the at least one first rotational body 34 to the assist controller 48. The crank detector 52B is configured to send, for example, a detection signal corresponding to the crank angle of the crank 18 to the assist controller 48.

The crank detector 52B includes, for example, a magnetic sensor configured to output a signal corresponding to the strength of a magnetic field. The crank detector 52B includes, for example, a ring-shaped magnet in which magnetic poles are arranged in the circumferential direction. The ring-shaped magnet is provided, for example, on the crank axle 20, on the at least one first rotational body 34, or in a power transmission path extending from the crank axle 20 to the at least one first rotational body 34. The ring-shaped magnet includes, for example, a single S-pole and a single N-pole. The single S-pole and the single N-pole each extend 180 degrees continuously about the rotational center axis of the crank axle 20.

The crank detector 52B is configured to detect the crank angle of the crank 18 based on the magnetic field strength. The crank detector 52B is configured to detect at least one of the rotational speed of the crank axle 20 and the rotational speed of the at least one first rotational body 34 based on changes in the magnetic field strength. Instead of a magnetic sensor, the crank detector 52B can include an optical sensor, an acceleration sensor, a gyro sensor, or a torque sensor.

The crank detector 52B is provided on, for example, the frame 16. In a case where the crank detector 52B is provided on the frame 16, the crank detector 52B can include a vehicle speed sensor. In a case where the crank detector 52B includes a vehicle speed sensor, the assist controller 48 can be configured to calculate the rotational speed of the crank axle 20 from the vehicle speed, which is detected by the vehicle speed sensor, and the transmission ratio.

The detector 52 includes, for example, a human driving force detector 52C. The human driving force detector 52C is configured to output, for example, a signal corresponding to the driving force applied to the crank axle 20 by human driving force. The human driving force detector 52C is provided, for example, on a member that is included in a transmission path of human driving force or on a member that is located in the vicinity of a member included in the transmission path of human driving force. A member included in the transmission path of human driving force includes, for example, the crank axle 20 and a member that transmits human driving force between the crank axle 20 and the at least one first rotational body 34.

The human driving force detector 52C includes a strain sensor, a magnetostrictive sensor, a pressure sensor, or the like. The strain sensor includes a strain gauge. The human driving force detector 52C can have any configuration as long as information related to the human driving force can be obtained.

The human driving force detector 52C can be provided on, for example, the first crank arm 22A, the second crank arm 22B, or one of the pedals 24. In a case where the human driving force detector 52C is provided on one of the pedals 24, the human driving force detector 52C can include a sensor that detects pressure applied to the pedal 24. The human driving force detector 52C can be provided on a chain included in the linking body 38. In a case where the human driving force detector 52C is provided on the chain, the human driving force detector 52C can include a sensor that detects the tension on the chain.

The assist controller 48 is configured to change the assist amount of the assist unit 42 for propulsion of the human-powered vehicle 10 by controlling the motor 46. The assist unit 42 can further include a drive circuit of the motor 46. The drive circuit is connected to, for example, the assist controller 48 in a manner allowing for wired or wireless communication. The drive circuit controls the motor 46, for example, in response to a control signal from the assist controller 48.

The drive circuit is, for example, electrically connected to the motor 46. The drive circuit controls, for example, the supply of electric power from the battery 40 to the motor 46. The drive circuit includes, for example, an inverter circuit. The inverter circuit includes, for example, a plurality of transistors. The inverter circuit includes, for example, a configuration of parallel-connected inverters, each formed by two series-connected transistors.

The assist controller 48 includes, for example, a plurality of assist control modes. The assist controller 48 is configured to control the assist unit 42 in one of the assist control modes.

The assist control modes include, for example, an assist mode and a non-assist mode. In the assist mode, the assist controller 48 is, for example, configured to control the motor 46 so that the assist unit 42 assists in propulsion of the human-powered vehicle 10. In the non-assist mode, the assist controller 48 is, for example, configured to control the motor 46 so that the assist unit 42 does not assist in propulsion of the human-powered vehicle 10.

The assist controller 48 is, for example, configured to control the motor 46 in the assist mode so that the motor 46 outputs assist force in accordance with the human driving force applied to the human-powered vehicle 10. Human driving force corresponds to, for example, the driving force applied to the at least one first rotational body 34 as the user rotates the crank axle 20. The assist force includes, for example, the driving force applied to the first rotational body 34 by the rotation of the motor 46. The assist force corresponds to the assist in propulsion of the human-powered vehicle 10 by the assist unit 42. The human driving force and assist force can be expressed by torque or power.

In the assist mode, the assist controller 48 is, for example, configured to control the motor 46 so that the assist level of the motor 46 becomes a predetermined assist level. The assist level includes, for example, at least one of an assist ratio of the assist force of the assist unit 42 to the human driving force applied to the human-powered vehicle 10 and the maximum value of the assist force of the assist unit 42.

In a case where the assist level includes the assist ratio, the predetermined assist level includes a predetermined assist ratio. The assist controller 48 is, for example, configured to control the motor 46 so that the assist ratio becomes the predetermined assist ratio. The predetermined assist ratio is configured to be changeable by the user of the human-powered vehicle 10. The predetermined assist ratio can be changed in accordance with the human driving force. The assist controller 48, for example, increases the predetermined assist ratio as the human driving force increases.

In a case where the assist level includes the maximum assist value, the predetermined assist level includes a predetermined maximum assist value. The assist controller 48 is, for example, configured to control the motor 46 so that the maximum assist value becomes less than or equal to the predetermined maximum assist value. The predetermined maximum assist value is determined by, for example, at least one of the output characteristic of the motor 46 and the control mode. The predetermined maximum assist value is configured to be changeable by the user of the human-powered vehicle 10.

The assist mode includes, for example, a first assist mode and a second assist mode, of which the assist level is greater than the first assist mode. The assist mode can include a third assist mode, of which the assist level is greater than the second assist mode. In a case where the assist level includes the assist ratio, the predetermined assist ratio in the second assist mode is greater than the predetermined assist ratio in the first assist mode. In a case where the assist level includes the maximum assist value, the predetermined maximum assist value in the second assist mode is greater than the predetermined maximum assist value in the first assist mode. The assist mode can include the third assist mode, of which the assist level is greater than the second assist mode.

Figure 3:
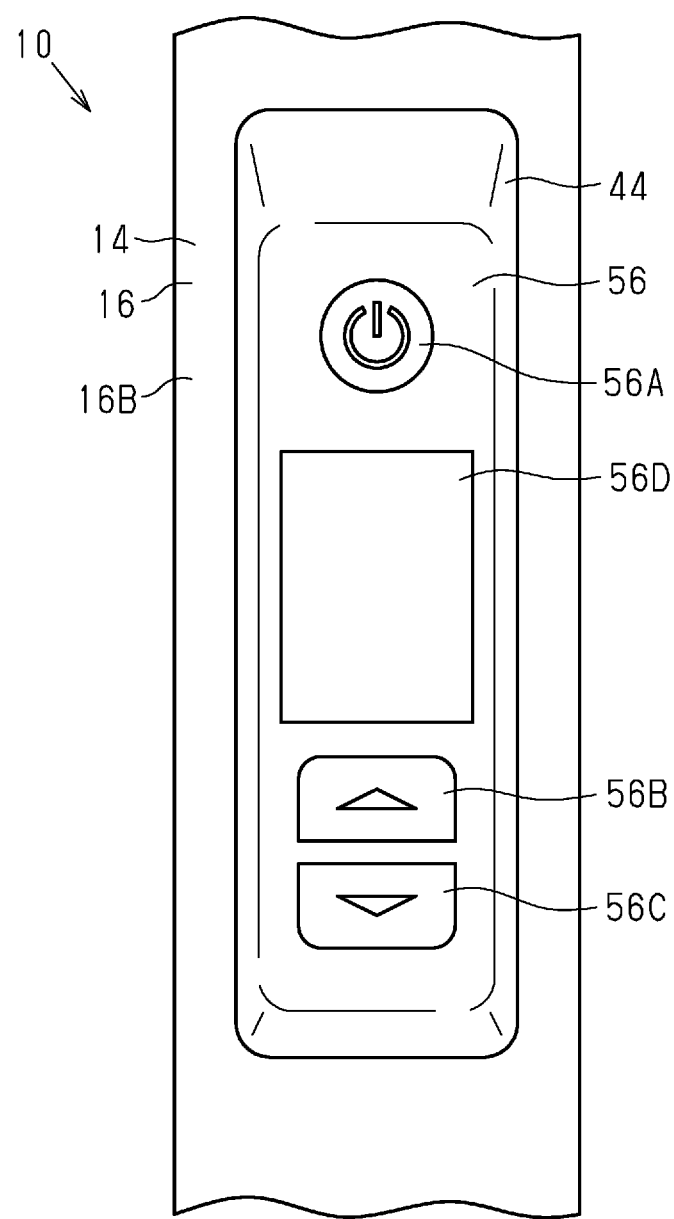
FIG. 3 is a schematic diagram showing an assist operation device illustrated in FIG. 2.

As shown in FIGS. 1 and 3, the assist operation device 44 is provided on, for example, the human-powered vehicle 10 at a location where it is operable by the user. The assist operation device 44 is provided on, for example, the vehicle body 14. The assist operation device 44 is attached to the frame 16. The assist operation device 44 is provided on, for example, the top tube 16B of the frame 16. The assist operation device 44 can be provided on the vehicle body 14 in a removable manner. The assist operation device 44 can be provided on the handlebar 28. The assist operation device 44 can be, for example, a cycle computer attached to the handlebar 28.

As shown in FIG. 2, the assist operation device 44 includes, for example, an assist operation controller 54. The assist operation controller 54 includes, for example, at least one processor that executes predetermined control programs. The at least one processor of the assist operation controller 54 includes, for example, a CPU or an MPU. The at least one processor of the assist operation controller 54 can be arranged at separate locations. Part of the at least one processor can be provided on the human-powered vehicle 10, and another part of the at least one processor can be provided in a server connected to the internet. In a case where the at least one processor is arranged at separate locations, parts of the at least one processor can communicate with one another through a wireless communication device. The assist operation controller 54 can include one or more microcomputers. The assist operation controller 54 can also be referred to as assist operation controller circuitry 54.

The assist operation controller 54 can include an assist operation storage. The assist operation storage stores, for example, control programs and information used in control processes. The assist operation storage includes, for example, a nonvolatile memory and a volatile memory.

The assist operation controller 54 is, for example, connected by a wire to the assist controller 48 in a manner allowing for wired communication. The assist operation controller 54 is configured to perform communication with the assist controller 48 through, for example, power line communication (PLC), CAN, or UART. The assist operation controller 54 can be connected to the assist controller 48 in manner allowing for wireless communication.

As shown in FIGS. 2 and 3, the assist operation device 44 includes an operating unit 56. The assist operation device 44 is configured to transmit an operation signal to the assist unit 42 through wired communication in a case where the operating unit 56 is operated by the user. If the user operates the operating unit 56, for example, the assist operation controller 54 transmits an operation signal to the assist controller 48. The operation signal includes, for example, a signal for controlling the assist unit 42. The operation signal, for example, changes the assist mode. The operation signal can include a signal that has the assist unit 42 enter a sleep mode or a signal that stops the supply of electric power to the assist unit 42. For example, upon receipt of a signal for changing the assist mode, the assist controller 48 changes the assist mode in accordance with the received operation signal.

The operating unit 56 includes, for example, a first operating portion 56A, a second operating portion 56B, a third operating portion 56C, and a display 56D. The first operating portion 56A is, for example, a power switch. If, for example, the first operating portion 56A is operated in a case where the assist control mode is the non-assist mode, the assist operation device 44 transmits a first operation signal to the assist unit 42 in order to start the assist. Upon receipt of the first operation signal, the assist unit 42 switches the assist control mode from the non-assist mode to the assist mode.

If, for example, the first operating portion 56A is operated in a case where the assist control mode is the assist mode, the assist operation device 44 transmits a second operation signal to the assist unit 42 in order to stop the assist. Upon receipt of the second operation signal, the assist unit 42 switches the assist control mode from the assist mode to the non-assist mode. The first operating portion 56A can include a switch for transmitting the first operation signal to the assist unit 42, and a switch for transmitting the second operation signal to the assist unit 42.

The second operating portion 56B and the third operating portion 56C are, for example, switches for shifting the assist level. If, for example, the second operating portion 56B is operated, the assist operation device 44 transmits a third operation signal to the assist unit 42 in order to increase the assist level. Upon receipt of the third operation signal, the assist unit 42 switches the assist mode to another assist mode in order to increase the assist level. If, for example, the third operation signal is received in a case where the assist mode is the first assist mode, the assist unit 42 switches the assist mode from the first assist mode to the second assist mode.

If, for example, the third operating portion 56C is operated, the assist operation device 44 transmits a fourth operation signal to the assist unit 42 in order to decrease the assist level. Upon receipt of the fourth operation signal, the assist unit 42 switches the assist mode to another assist mode in order to decrease the assist level. If, for example, the fourth operation signal is received in a case where the assist mode is the second assist mode, the assist unit 42 switches the assist mode from the second assist mode to the first assist mode. The second operating portion 56B and the third operating portion 56C can be, for example, used for selection of a function other than the assist mode.

The display 56D shows, for example, the state of the assist unit 42. The display 56D shows, for example, the present assist control mode. The display 56D can show the remaining capacity of the battery 40. The display 56D can show the state of the human-powered vehicle 10. The display 56D can show the state of a component, other than the assist unit 42, provided on the human-powered vehicle 10.

The assist operation device 44 includes, for example, an assist operation communicator 58. The assist operation communicator 58 is, for example, configured to perform wireless communication with the transmission device 62 of the control system 60 and a transmission operation device 64 of the control system 60. The assist operation communicator 58 can also be referred to as assist operation communicator circuitry 58.

As shown in FIGS. 1 and 2, the human-powered vehicle 10 includes the control system 60. The control system 60 includes the transmission device 62 and the transmission operation device 64, which operates the transmission device 62. The control system 60 further includes, for example, the assist unit 42 and the assist operation device 44. The control system 60 can include a first control system 60A, which includes the transmission device 62 and the transmission operation device 64, and a second control system 60B, which includes the assist unit 42 and the assist operation device 44. For example, a group of components included in the first control system 60A form a first communication group, and a group of components included in the second control system 60B form a second communication group. Part of the component group included in the first control system 60A can be included in the second control system 60B. Part of the component group included in the second control system 60B can be included in the first control system 60A.

The transmission device 62 is configured to perform a shifting action that shifts the transmission ratio of the human-powered vehicle 10. The transmission ratio is, for example, the ratio of the rotational speed of a wheel 12 to the rotational speed of the crank axle 20. The rotational speed of the wheel 12 is, for example, the rotational speed of the drive wheel. The transmission device 62 is provided in, for example, a transmission path of human driving force in the human-powered vehicle 10.

The transmission device 62 includes, for example, at least one of a derailleur 62A and an internal-gear hub. In the present embodiment, the transmission device 62 includes the derailleur 62A. In a case where the transmission device 62 includes the derailleur 62A, the linking body 38 includes a chain. The linking body 38 can include a belt. The derailleur 62A includes, for example, an electric actuator. The electric actuator, for example, is configured to actuate the derailleur 62A. In a case where the transmission device 62 includes an internal-gear hub, for example, the internal-gear hub is provided on the hub of the rear wheel 12R.

The derailleur 62A is, for example, configured to operate the linking body 38 so as to shift the transmission ratio. The derailleur 62A shifts the transmission ratio by moving the linking body 38 from one of the rotational bodies onto another one of the rotational bodies. In a case where the rotational bodies are sprockets, the rotational bodies, for example, differ from one another in the number of teeth.

The derailleur 62A is, for example, configured to move the linking body 38 from one of the rotational bodies to another one of the rotational bodies. The rotational bodies include, for example, sprockets. The derailleur 62A is, for example, configured to move the linking body 38 from one of the sprockets to another one of the sprockets.

The at least one first rotational body 34 includes, for example, a plurality of first rotational bodies 34. The at least one second rotational body 36 includes, for example, a plurality of second rotational bodies 36. The rotational bodies include, for example, at least one of the plurality of first rotational bodies 34 and the plurality of second rotational bodies 36. The first rotational bodies 34 include, for example, a plurality of first sprockets. The second rotational bodies 36 include, for example, a plurality of second sprockets. The rotational bodies include, for example, at least one of the plurality of first sprockets and the plurality of second sprockets.

The derailleur 62A is, for example, configured to perform a shifting action. The derailleur 62A performs a shifting action that shifts the transmission ratio by operating the linking body 38 to change the engagement state of the rotational bodies and the linking body 38.

The transmission device 62, for example, shifts a transmission stage to perform a shifting action. The transmission device 62 is, for example, configured to select one of a plurality of transmission stages. For example, the transmission stages are set to have different transmission ratios. For example, a higher transmission stage has a larger transmission ratio. The transmission stages are set, for example, in accordance with the number of teeth on the rotational bodies.

The shifting action includes an up-shift operation and a down-shift operation. The transmission device 62 is, for example, configured to perform an up-shift operation for shifting from one of the transmission stages to another one of the transmission stages in order to increase the transmission ratio. The transmission device 62 is, for example, configured to perform a down-shift operation for shifting from one of the transmission stages to another one of the transmission stages in order to decrease the transmission ratio.

The derailleur 62A is, for example, configured to operate the linking body 38 in order to shift from one of the transmission stages to another one of the transmission stages. The transmission stages are set, for example, in accordance with at least one of the rotational bodies.

The derailleur 62A, for example, moves the chain from one of the sprockets onto another one of the sprockets. The derailleur 62A includes, for example, a rear derailleur and a front derailleur. The transmission ratio of each transmission stage is set, for example, in accordance with the combination of one of the first sprockets with another one of the second sprockets.

The derailleur 62A can include only one of the rear derailleur and the front derailleur. In a case where the derailleur 62A includes only the rear derailleur, the transmission ratio of each transmission stage is set in accordance with one of the second sprockets. In a case where the derailleur 62A includes only the front derailleur, the transmission ratio of each transmission stage is set in accordance with one of the first sprockets.

The rear derailleur selects one of the second sprockets in accordance with the selected transmission stage. The rear derailleur moves the chain to the sprocket selected in accordance with the selected transmission stage. In a case where the maximum one of the transmission stages is selected, the rear derailleur selects the one of the second sprockets having the smallest number of teeth. In a case where the minimum one of the transmission stages is selected, the rear derailleur selects the one of the second sprockets having the largest number of teeth.

The front derailleur selects one of the first sprockets in accordance with the selected transmission stage. The front derailleur moves the chain to the sprocket selected in accordance with the selected transmission stage. In a case where the maximum one of the transmission stages is selected, the front derailleur selects the one of the first sprockets having the smallest number of teeth. In a case where the minimum one of the transmission stages is selected, the front derailleur selects the one of the first sprockets having the largest number of teeth.

At least one of the rotational bodies can include a shifting facilitation region that facilitates the shifting action of the transmission device 62. The transmission facilitation region allows the derailleur 62A to smoothly move the linking body 38 from one of the rotational bodies to an adjacent one of the rotational bodies. The shifting facilitation region includes, for example, a recess formed in at least one of the side surface of a sprocket and the teeth of a sprocket. The shifting facilitation region includes a first shifting region that facilitates an up-shift operation and a second shifting region that facilitates a down-shift operation.

The transmission device 62 includes a first communicator 66A, which serves as first communicator circuitry, an actuator 68, and a transmission controller 70. The first communicator 66A is, for example, a communication device. The actuator 68 is configured to perform a shifting action. The actuator 68 corresponds to, for example, an electric actuator of the derailleur 62A.

The transmission controller 70 includes, for example, at least one processor that executes predetermined control programs. The at least one processor of the transmission controller 70 includes, for example, a CPU or an MPU. The at least one processor of the transmission controller 70 can be arranged at separate locations. Part of the at least one processor can be provided on the human-powered vehicle 10, and another part of the at least one processor can be provided in a server connected to the internet. In a case where the at least one processor is arranged at separate locations, parts of the at least one processor can communicate with one another through a wireless communication device. The transmission controller 70 can include one or more microcomputers. The transmission controller 70 can also be referred to as transmission controller circuitry 70.

The transmission controller 70 can include a transmission storage. The transmission storage stores, for example, control programs and information used for control processes. The transmission storage includes, for example, a nonvolatile memory and a volatile memory.

The transmission device 62 includes, for example, a communicator 66. The communicator 66 is, for example, a communication device. The communicator 66 is, for example, configured to communicate with the assist operation device 44, which is configured to operate the assist unit 42 that assists in propulsion of the human-powered vehicle 10, and the transmission operation device 64, which is configured to operate the transmission device 62. The transmission device 62 includes, for example, a second communicator 66B serving as a second communication unit. The second communicator 66B is, for example, a communication device. The communicator 66 includes for example, the first communicator 66A and the second communicator 66B. The communicator 66 can also be referred to as communicator circuitry 66. The first communicator 66A can also be referred to as first communicator circuitry 66A. The second communicator 66B can also be referred to as second communicator circuitry 66B.

The transmission device 62 further includes, for example, a substrate 72 on which the first communicator 66A and the second communicator 66B are mounted. The substrate 72 is, for example, a printed circuit board. For example, the transmission controller 70 is mounted on the substrate 72. The substrate 72 is, for example, accommodated in a housing of the transmission device 62.

The transmission device 62 further includes, for example, a cable connector 74 configured to be connected to the power cable 40A. The power cable 40A is, for example, configured to be connected to the battery 40. The cable connector 74 includes, for example, a socket for insertion of a connector of the power cable 40A. The cable connector 74 is arranged on, for example, the outer surface of the housing of the transmission device 62. The cable connector 74 is electrically connected to the substrate 72. The communicator 66, the transmission controller 70, and the actuator 68 are supplied with electric power from the battery 40 via the cable connector 74.

The communicator 66 is, for example, configured to perform wireless communication with the assist operation device 44 and the transmission device 62. The communicator 66 includes, for example, an antenna used to perform wireless communication with the assist operation device 44 and the transmission device 62. The communicator 66 can be configured to perform wired communication with the assist operation device 44 and the transmission device 62.

The first communicator 66A communicates with, for example, the assist operation device 44 using a first communication protocol, and the second communicator 66B communicates with, for example, the transmission operation device 64 using a second communication protocol. The second communication protocol, for example, differs from the first communication protocol.

The first communication protocol includes, for example, wireless communication using a wireless signal of a first signal, and the second communication protocol includes wireless communication using a wireless signal of a second frequency. The second frequency differs from the first frequency. The first frequency is, for example, in the 2.4 GHz band. The first communication protocol is, for example, Bluetooth®. The second frequency is, for example, higher than or lower than the first frequency.

At least one of the first communicator 66A and the second communicator 66B is configured to change frequencies. For example, the first communicator 66A is allowed to change the first frequency, and the second communicator 66B is not allowed to change the second frequency. The first communicator 66A, for example, is allowed to change the first frequency within a predetermined range. In a case where the first communicator 66A and the second communicator 66B are both allowed to change frequencies, a predetermined range in which the first communicator 66A is allowed to change the first frequency can be the same as or differ from a predetermined range in which the second communicator 66B is allowed to change the second frequency. The first communicator 66A and the second communicator 66B can both be prohibited from changing frequencies.

The transmission controller 70 is, for example, configured to control the communicator 66 in accordance with the communication control state. The communication control state includes a first communication control state and a second communication control state. The transmission controller 70 is, for example, configured to switch the communication control state from one of the first communication control state and the second communication control state to another of the first communication control state and the second communication control state. The transmission controller 70 is, for example, configured to control the communicator 66 in the first communication control state so that the communicator 66 communicates with the assist operation device 44 using the first communication protocol. The transmission controller 70 is, for example, configured to control the communicator 66 in the second communication control state so that the communicator 66 communicates with the transmission operation device 64 using the second communication protocol.

The transmission controller 70 is, for example, configured to control the first communicator 66A and the second communicator 66B in accordance with the communication control state. The transmission controller 70 is, for example, configured to control the first communicator 66A in the first communication control state so that the first communicator 66A communicates with the assist operation device 44 using the first communication protocol. The transmission controller 70 is, for example, configured to control the second communicator 66B in the second communication control state so that the second communicator 66B communicates with the transmission operation device 64 using the second communication protocol.

In a case where the communication control state is the first communication control state, for example, the transmission controller 70 controls the communicator 66 so that the first communicator 66A is allowed to receive a first shift command and the second communicator 66B is not allowed to receive a second shift command. In a case where the communication control state is the second communication control state, for example, the transmission controller 70 controls the communicator 66 so that the first communicator 66A is not allowed to receive a first shift command and the second communicator 66B is allowed to receive a second shift command.

The transmission device 62 includes, for example, an operation input unit 76. The operation input unit 76 includes, for example, at least one of a button, a dial, and a lever. An operator operates the operation input unit 76 to change the communication control state of the transmission controller 70. The operation input unit 76 can be provided outside the transmission device 62. The operation input unit 76 can be provided on the transmission operation device 64. The operation input unit 76 can be provided on at least one of a personal computer, a tablet-type computer, and a smartphone. Further, the operation input unit 76 can be configured to be connected to the transmission device 62 in a manner allowing for wired or wireless communication. In a case where the operation input unit 76 is provided on at least one of a personal computer, a tablet-type computer, and a smartphone, for example, the user operates the operation input unit 76 before riding the human-powered vehicle 10.

The transmission controller 70 can change the communication control state regardless of operation of the operation input unit 76. The transmission controller 70, for example, changes the communication control state in accordance with the state of the electric power supplied to the transmission device 62. The transmission controller 70, for example, changes the communication control state in accordance with whether the transmission device 62 and the battery 40 are connected. For example, the human-powered vehicle 10 can include a transmission device battery that differs from the battery 40. The transmission device 62 can be, for example, configured to be supplied with electric power from the transmission device battery in a case where the transmission device 62 is not connected to the battery 40. The transmission device 62 can include a battery compartment for accommodating the transmission device battery.

The transmission controller 70, for example, switches the communication control state to the first communication control state in a case where the transmission device 62 is connected to the battery 40. The transmission controller 70, for example, switches the communication control state to the second communication control state in a case where the transmission device 62 is not connected to the battery 40. The transmission controller 70 can switch the communication control state to the second communication control state in a case where the transmission device 62 is supplied with electric power from the transmission device battery. In a case where the transmission device 62 includes a battery compartment for accommodating the transmission device battery, the transmission controller 70 can change the communication control state in accordance with whether the transmission device battery is accommodated in the compartment. The transmission device 62 can determine whether the transmission device 62 is supplied with electric power from the transmission device battery based on whether the transmission device battery is accommodated in the battery compartment. By changing the communication control state in accordance with the state of the electric power supplied to the transmission device 62, if the human-powered vehicle 10 does not include the assist unit 42, the transmission controller 70 can switch the communication control state to the second communication control state. Accordingly, the communication control state is changed without the user performing an operation. This improves usability.

The transmission controller 70, for example, changes the communication control state in accordance with the connection state of the cable connector 74 and the power cable 40A. The transmission controller 70 can switch the communication control state to the first communication control state in a case where the power cable 40A is connected to the cable connector 74. The transmission controller 70 can switch the communication control state to the second communication control state in a case where the power cable 40A is not connected to the cable connector 74.

The operator, for example, sets the communication control state to establish a communication network in the control system 60. For example, to establish a communication network in the control system 60 so that the assist operation device 44 controls the transmission device 62, the operator operates the operation input unit 76 and selects the first communication control state. For example, to establish a communication network in the control system 60 so that the assist operation device 44 does not control the transmission device 62, the operator operates the operation input unit 76 and selects the second communication control state. The operator does not have to be the user and can be the manufacturer. A case where a communication network is established in the control system 60 so that the assist operation device 44 does not control the transmission device 62 is, for example, a case in which the human-powered vehicle 10 does not include the assist operation device 44, which is configured to control the transmission device 62.

Figure 4:
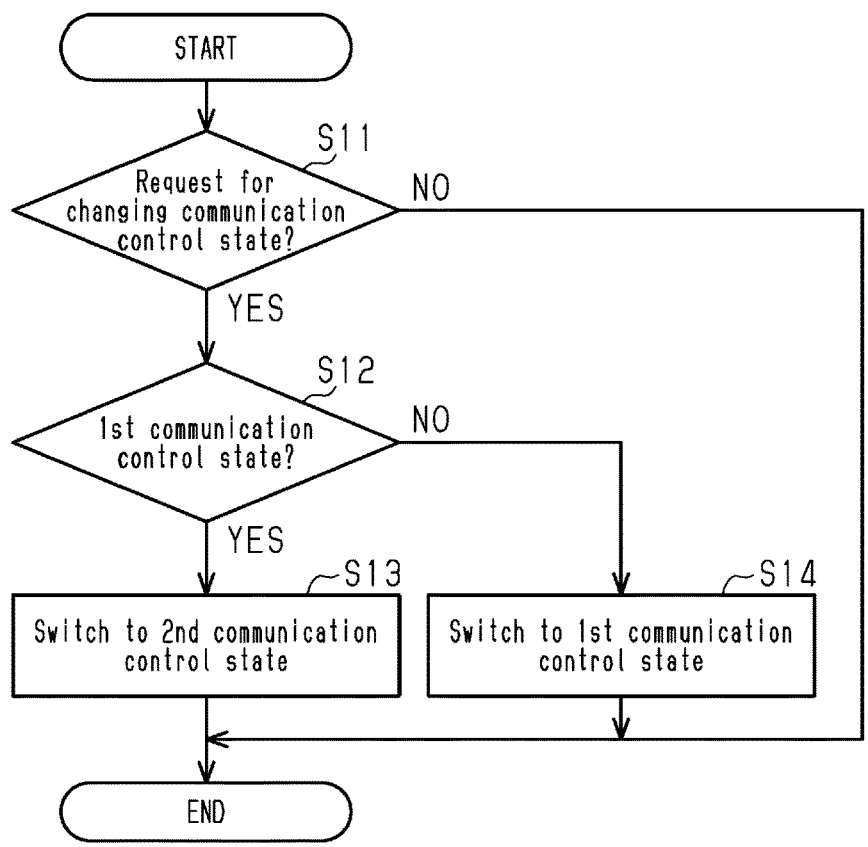
FIG. 4 is a flowchart of a process for switching communication control states executed by a transmission controller illustrated in FIG. 2.

With reference to FIG. 4, a process for changing the communication control state will now be described. In a case where, for example, the transmission controller 70 is supplied with electric power, the transmission controller 70 starts the process and proceeds to step S11 of the flowchart illustrated in FIG. 4. Upon completion of the flowchart illustrated in FIG. 4, the transmission controller 70 repeats the process from step S11 in predetermined cycles until, for example, the supply of electric power is stopped.

In step S11, the transmission controller 70 determines whether there is a request for changing the communication control state. The transmission controller 70 determines that there is a request for changing the communication control state, for example, in a case where the operation input unit 76 is operated. In a case where there is a request for changing the communication control state, the transmission controller 70 proceeds to step S12. In a case where there is no request for changing the communication control state, the transmission controller 70 ends the process. The transmission controller 70 can determine that there is a request for changing the communication control state based on at least one of whether the transmission device 62 and the battery 40 are connected, whether the transmission device battery is accommodated in the battery compartment, whether the cable connector 74 is connected to the power cable 40A, and whether the transmission device 62 is connected to the assist operation device 44.

In step S12, the transmission controller 70 determines whether the communication control state is the first communication control state. In a case where the communication control state is the first communication control state, the transmission controller 70 proceeds to step S13. In step S13, the transmission controller 70 switches the communication control state to the second communication control state and then ends the process.

In a case where the communication control state is not the first communication control state in step S12, the transmission controller 70 proceeds to step S14. In step S14, the transmission controller 70 switches the communication control state to the first communication control state and then ends the process.

The transmission operation device 64 includes a transmission operation controller 78. The transmission operation controller 78 includes, for example, at least one processor that executes predetermined control programs. The at least one processor of the transmission operation controller 78 includes, for example, a CPU or an MPU. The at least one processor of the transmission operation controller 78 can be arranged at separate locations. Part of the at least one processor can be provided on the human-powered vehicle 10, and another part of the at least one processor can be provided in a server connected to the internet. In a case where the at least one processor is arranged at separate locations, parts of the at least one processor can communicate with one another through a wireless communication device. The transmission operation controller 78 can include one or more microcomputers. The transmission operation controller 78 can also be referred to as transmission operation controller circuitry 78.

The transmission operation device 64 includes, for example, a transmission operation storage 80. The transmission operation storage 80 is, for example, connected to the transmission operation controller 78 in a manner allowing for wired or wireless communication. The transmission operation storage 80 stores, for example, control programs and information used for control processes. The transmission operation storage 80 includes, for example, a nonvolatile memory and a volatile memory.

The transmission operation device 64 includes, for example, at least one transmission operating unit 82 that is operated by the user. The transmission operating unit 82 includes, for example, at least one of a button, a dial, and a lever. The transmission operating unit 82 can include two operating portions corresponding to an up-shift operation and a down-shift operation. The transmission operation controller 78 generates a shift command in accordance with the operation of the transmission operating unit 82. The shift command includes, for example, a command for an up-shift operation or a command for a down-shift operation.

The transmission operation device 64 includes, for example, a transmission operation communicator 84. The transmission operation device 64 is, for example, configured to communicate with the assist operation device 44 using the first communication protocol. The transmission operation device 64 is, for example, configured to communicate with the transmission device 62 using the second communication protocol. The transmission operation communicator 84, for example, communicates with the assist operation communicator 58 using the first communication protocol, and communicates with the second communicator 66B using the second communication protocol. The transmission operation communicator 84 includes a first transmission operation communicator that uses the first communication protocol and a second transmission operation communicator that uses the second communication protocol. The transmission operation communicator 84 can also be referred to as transmission operation communicator circuitry 84.

The transmission operation controller 78 is, for example, configured to select one of the first communication protocol and the second communication protocol to transmit the shift command. The transmission operation controller 78 is, for example, configured to select one of the first communication protocol and the second communication protocol in accordance with the communication control state of the transmission device 62. The transmission operation controller 78 is, for example, configured to transmit a shift command using the first communication protocol in a case where the communication control state of the transmission device 62 is the first communication control state. The transmission operation controller 78 is, for example, configured to transmit a shift command using the second communication protocol in a case where the communication control state of the transmission device 62 is the second communication control state. The transmission operating unit 82 can switch the communication protocol based on an operation performed on the operation input unit 76, and can include a switching operating portion for switching the communication protocol of the transmission operation communicator 84. The transmission operation controller 78 can be configured to receive the present communication control state from the transmission controller 70.

The transmission operation controller 78 is configured to transmit a first command to the assist operation device 44 through wireless communication. The assist operation communicator 58 of the assist operation device 44, for example, receives the first command through wireless communication. The first command is, for example, a shift command. The transmission operation controller 78 is, for example, configured to have the transmission operation communicator 84 transmit the first command in response to operation of the transmission operating unit 82 by the user. The transmission operation controller 78 is, for example, configured to have the transmission operation communicator 84 transmit the first command if the transmission operating unit 82 is operated by the user in a case where the communication control state is the first communication control state.

In a case where the communication control state is the second communication control state, the transmission operation controller 78 is configured to transmit a second shift command to the transmission device 62 through wireless communication. In a case where the communication control state is the second communication control state, the transmission device 62, for example, receives the second shift command directly from the transmission operation device 64 and not through the assist operation device 44. In a case where the communication control state is the second communication control state, the transmission operation controller 78 is, for example, configured to have the transmission operation communicator 84 transmit the second shift command in response to operation of the transmission operating unit 82 by the user.

The assist operation controller 54 transmits, for example, the first shift command to the transmission device 62 in a case where the assist operation communicator 58 receives the first command. The first shift command is a signal for having the transmission device 62 perform a shifting action. The first communicator 66A of the transmission device 62 is, for example, configured to receive the first shift command through wireless communication. The first communicator 66A is, for example, configured to receive the first shift command, which is transmitted from the assist operation device 44 using the first communication protocol, through wireless communication. The first communicator 66A is configured to receive the first shift command, which is transmitted from the assist operation device 44, in a case where the assist operation device 44 receives the first command.

The transmission operation device 64 is, for example, configured to transmit a second shift command to the transmission device 62 through wireless communication. The second shift command is a signal for having the transmission device 62 perform a shifting action. The second communicator 66B is, for example, configured to receive the second shift command, which is transmitted from the transmission operation device 64 using the second communication protocol, through wireless communication. The second communicator 66B is, for example, configured to receive the second shift command through wireless communication. The second communicator 66B of the transmission device 62 is, for example, configured to receive the second shift command through wireless communication. The second shift command is, for example, a shift command. The transmission operation controller 78 is, for example, configured to transmit the second shift command to the transmission operation communicator 84 in response to operation of the transmission operating unit 82 by the user. The transmission operation controller 78 is, for example, configured to have the transmission operation communicator 84 transmit the second shift command in response to operation of the transmission operating unit 82 by the user in a case where the communication control state is the second communication control state.

The transmission controller 70 is configured to control the actuator 68 in accordance with the shift command. The transmission controller 70 actuates the actuator 68 to perform a shifting action. The transmission controller 70 performs an up-shift operation or a down-shift operation in accordance with the received shift command.

The transmission controller 70 is configured to control the actuator 68 so that a shifting action is performed in accordance with the first shift command. In a case where the first communicator 66A receives the first shift command, the transmission controller 70 performs an up-shift operation or a down-shift operation in accordance with the received first shift command. The transmission controller 70 is, for example, configured to control the actuator 68 so that the actuator 68 initiates a shifting action in response to receipt of the first shift command by the first communicator 66A. The transmission controller 70 is, for example, configured to control the actuator 68 so that the actuator 68 initiates a shifting action in a case where the first communicator 66A receives the first shift command. The transmission controller 70 is, for example, configured to control the actuator 68 so that the actuator 68 initiates a shifting action at a shifting initiation time after the first communicator 66A receives the first shift command.

The transmission controller 70 is configured to control the actuator 68 so that the actuator 68 performs a shifting action in accordance with a second shift command. In a case where the second communicator 66B receives the second shift command, the transmission controller 70 performs an upshift operation or a down-shift operation in accordance with the received second shift command. The transmission controller 70 is, for example, configured to control the actuator 68 so that the actuator 68 initiates a shifting action in response to receipt of the second shift command by the second communicator 66B. The transmission controller 70 is, for example, configured to control the actuator 68 so that the actuator 68 initiates a shifting action in a case where the second communicator 66B receives the second shift command. The transmission controller 70 is, for example, configured to control the actuator 68 so that the actuator 68 initiates a shifting action at a shifting initiation time after the second communicator 66B receives the second shift command.

The communicator 66 can transmit the state of the transmission device 62 to a human-powered vehicle component that differs from the transmission device 62. The communicator 66 can notify the assist unit 42 of at least one of shifting action initiation and shifting action termination, and can notify the assist unit 42 of actuation initiation and actuation termination of the actuator 68. The communicator 66 can, for example, notify the assist operation device 44 of the present transmission stage of the transmission device 62. The assist operation device 44 can, for example, show the present transmission stage of the transmission device 62 on the display 56D.

The assist operation device 44 receives the first command that is transmitted from the transmission operation device 64. The assist operation device 44 is configured to transmit the first command to the assist unit 42. The first command is received from the transmission operation device 64 that operates the transmission device 62. The assist operation device 44 is, for example, configured to communicate with the transmission device 62 using the first communication protocol. The assist operation device 44 transmits the first shift command, which is received from the assist unit 42, to the transmission device 62.

The assist unit 42 receives the first command from the assist operation device 44 through wired communication. The assist unit 42 is configured to have the assist operation device 44 transmit the first shift command in response to the first command received from the assist operation device 44. The assist controller 48 is configured to have the assist operation device 44 transmit the first shift command to the transmission device 62 in response to receipt of the first command from the assist operation device 44. In a case where, for example, the assist operation device 44 receives the first command, the first shift command is transmitted from the assist operation device 44 according to a predetermined period.

In the control system 60, the transmission device 62 is configured to perform a shifting action in accordance with the predetermined period. The assist controller 48 is, for example, configured to calculate the predetermined period based on the output of the detector 52. The predetermined period is based on, for example, at least one of a cadence of the human-powered vehicle 10 and a crank angle of the crank 18 of the human-powered vehicle 10. The predetermined period is determined based on, for example, one of a cadence, human driving force, a rotational angle of the crank 18, a rotational angle of the second rotational body 36, and a transmission stage. The predetermined period can be, for example, a fixed period. The fixed period is, for example, set by the transmission device 62 as time that is sufficient for completing shifting of the transmission ratio.

The predetermined period is, for example, set to allow the transmission device 62 to shift the transmission ratio in a preferred manner. The predetermined period includes, for example, a period during which the human driving force decreases. The predetermined period is calculated by, for example, the assist unit 42. The transmission device 62 is configured to perform a shifting action based on the predetermined period. The transmission device 62 determines from the predetermined period, for example, an initiation time at which a shifting action is initiated. The transmission device 62 from the predetermined period, for example, a period during which the actuator 68 is actuated. The assist unit 42 is configured to reduce the assist force based on the predetermined period. Based on the predetermined period, the assist unit 42, for example, reduces the assist force during the period in which the transmission device 62 performs a shifting action.

The predetermined period, for example, corresponds to a period during which the human driving force is less than or equal to a predetermined ratio of the maximum value of the human driving force. The assist controller 48 is, for example, configured to acquire the maximum value of the human driving force in predetermined cycles based on the detection result of the human driving force detector 52C. The predetermined ratio is, for example, 10 percent of greater and 90 percent or less. The predetermined ratio is, for example, 60 percent or greater and 80 percent or less. The value of the human driving force is for example, at a minimum in a case where the first crank arm 22A or the second crank arm 22B is located at the top dead center or the bottom dead center. The value of the human driving force is for example, at a maximum in a case where the first crank arm 22A or the second crank arm 22B is located at a position corresponding to a peak point between the top dead center and the bottom dead center. In a case where the first crank arm 22A is rotated in a first direction, the first crank arm 22A rotates from the peak point, passes the top dead center, the next peak point, and the low dead center, and then returns to the first peak point.

The predetermined period is, for example, based on the time point at which the rotational angle of the crank 18 reaches an angle corresponding to the top dead center or an angle corresponding to the bottom dead center. The predetermined period is, for example, based on the time point at which the first crank arm 22A or the second crank arm 22B is located at the top dead center or the bottom dead center. In the description hereafter, the basis for the predetermined period will be the time point at which the first crank arm 22A is located at the top dead center. The basis of the predetermined period can be the time point at which the first crank arm 22A is located at the bottom dead center, the time point at which the second crank arm 22B is located at the top dead center, or the time point at which the second crank arm 22B is located at the bottom dead center.

In a case where the second rotational body 36 includes a shifting facilitation region, the predetermined period can be determined based on the shifting facilitation region. In a case where the predetermined period is determined based on the shifting facilitation region, the predetermined period is determined, for example, based on the rotational angle of the second rotational body 36.

In a case where the predetermined period is determined based on the shift stage, for example, the assist storage 50 stores information related to each transmission stage and information related to the shifting period required for shifting from one transmission stage to another transmission stage. The information related to the shifting period includes, for example, a table storing a transmission stage prior to shifting and a stage shifting period corresponding to a transmission stage subsequent to shifting. The shifting period is set, for example, in accordance with a predetermined rotational angle and the amount of the chain wound around the sprocket corresponding to the shifted transmission stage. The predetermined rotational angle can be a fixed value or changed in accordance with the sprocket size. The wound amount of the chain includes the length over which the sprocket and the linking body 38 are engaged with each other.

The assist controller 48, for example, determines the predetermined period upon receipt of the first command. The assist controller 48 generates the first shift command based on the predetermined period. The first shift command includes, for example, information related to the shifting initiation time and the actuation time of the actuator 68. The assist controller 48 generates the first shift command based on the predetermined period. Upon receipt of the first shift command, the transmission controller 70 initiates a shifting action based on the information related to the shifting initiation time and the actuation time of the actuator 68 included in the first shift command.

The assist unit 42 is, for example, configured to reduce the assist force in response to the first command. The assist unit 42 is configured to reduce the assist force based on the shifting initiation time and the actuation time of the actuator 68 that are determined by the first command. The predetermined period corresponds to, for example, the period during which the assist force of the assist unit 42 is reduced in accordance with the first command. The assist controller 48, for example, calculates a reduction period during which the assist force is reduced based on the shifting initiation time and the actuation time of the actuator 68. The initiation time of the reduction period is set, for example, to earlier than the shifting initiation time. The initiation time of the reduction period can be set to later than the shifting initiation time. The termination time of the reduction period is set, for example, to the actuation completion of the actuator 68 or later. The termination time of the reduction period can be set to earlier than the actuation completion of the actuator 68. The termination time of the reduction period can be set to the point of time at which completion of transmission ratio shifting is completed.

The assist unit 42 is, for example, configured to perform no assist during the reduction period. The assist unit 42, for example, sets the assist force to zero during the reduction period.

The assist controller 48 can be configured to control the motor 46 so that the assist level during the reduction period becomes a transmission assist level. The transmission assist level is lower than the predetermined assist level. The transmission assist level can be change in accordance with the shifting action. For example, the assist level is set to be smaller as the difference in transmission ratio before and after shifting increases.

The assist controller 48 can, for example, change the transmission assist level in accordance with the human driving force. The assist controller 48, for example, changes the transmission assist level so that the transmission assist level decreases as the human driving force increases. The control system 60 greatly decreases the assist force of the assist unit 42 as the human driving force becomes larger. Thus, the decrease in assist force will most likely not be noticed by the user.

The assist controller 48 can, for example, change the transmission assist level in accordance with the pitch angle of the human-powered vehicle 10. The assist controller 48, for example, changes the transmission assist level so that the transmission assist level increases as the pitch angle of the human-powered vehicle 10 increases. By changing the transmission assist level in accordance with the pitch angle of the human-powered vehicle 10, the transmission device 62 can perform a shifting action by maintaining the assist force of the assist unit 42 in a case where the human-powered vehicle 10 is traveling uphill.

In a case where the assist level includes an assist ratio, the transmission assist level includes a transmission assist ratio. The assist controller 48 is, for example, configured to control the motor 46 so that the assist ratio becomes the transmission assist ratio during the reduction period. The transmission assist ratio can be changed in accordance with a shift action. For example, the transmission assist ratio is set to be smaller as the difference in transmission ratio before and after shifting increases.

In a case where the assist level includes the maximum assist value, the transmission assist level includes a transmission maximum assist value. The assist controller 48 is, for example, configured to control the motor 46 so that the maximum assist value becomes less than or equal to the transmission maximum assist value during the reduction period. The predetermined maximum assist value can be changed in accordance with a shift action. For example, the transmission maximum assist value ratio is set to be smaller as the difference in transmission ratio before and after shifting increases.

The transmission device 62 is configured to control the motor 46 so that the assist level is the predetermined assist level in a case where the reduction period ends. The transmission device 62 can be configured to increase the assist level in a case where the reduction period ends so as to change the assist level from the transmission assist level to the predetermined assist level prior to shifting over a predetermined increasing period. By changing the assist level over the predetermined increasing period, the change in assist force of the assist unit 42 will most likely not be noticed by the user.

In a case where the assist force is less than or equal to the predetermined assist force during the predetermined period, the assist unit 42 can be configured so that the assist force is not decreased during the predetermined period. The predetermined assist force is, for example, set to a value that does not affect the shifting action of the transmission device 62.

In a case where the transmission device 62 performs a shifting action in response to a second shift command, the transmission controller 70 can be configured to calculate the predetermined period. The transmission controller 70 can be configured to calculate the predetermined period based on the output of the detector 52. In a case where the transmission device 62 performs a shift action in response to the second shift command, the transmission device 62 determines the shifting initiation time and the actuation time of the actuator 68 based on the predetermined period. In a case where the transmission device 62 performs a shift action in response to the second shift command, the transmission device 62 can be configured to transmit the predetermined period calculated by the transmission controller 70 to the assist unit 42.

Figure 5:
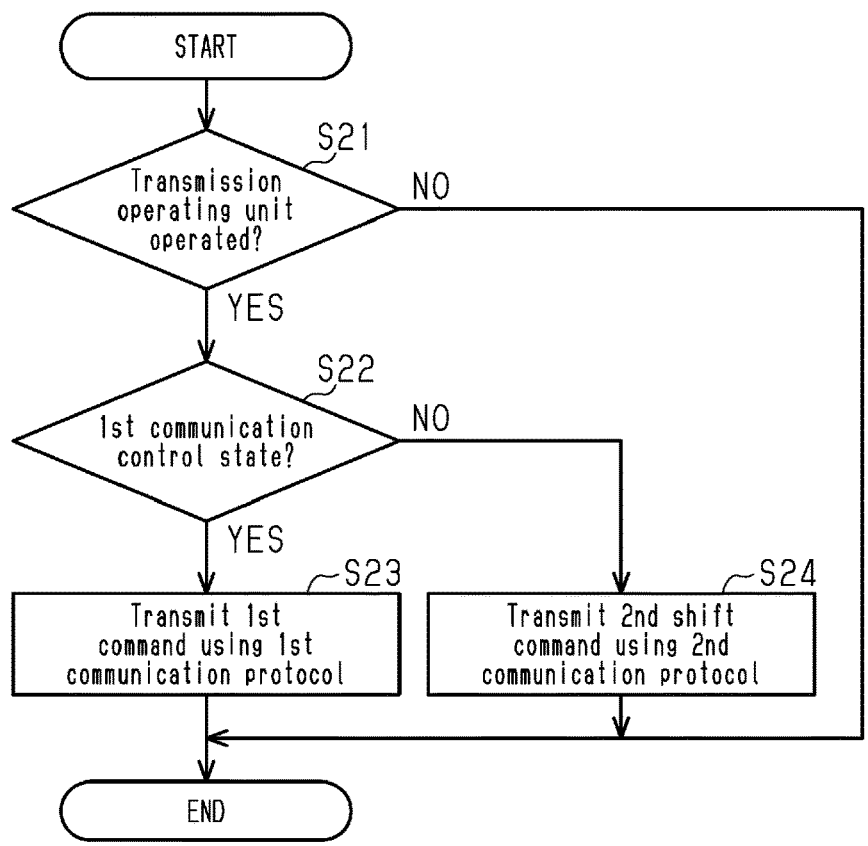
FIG. 5 is a flowchart of a process for controlling a transmission operation device executed by a transmission operation controller illustrated in FIG. 2.

With reference to FIG. 5, a process in which the transmission operation controller 78 controls the transmission operation device 64 in the control system 60 will now be described. In a case where, for example, the transmission operation controller 78 is supplied with electric power, the transmission operation controller 78 starts the process and proceeds to step S21 of the flowchart illustrated in FIG. 5. Upon completion of the flowchart illustrated in FIG. 5, the transmission operation controller 78 repeats the process from step S21 in predetermined cycles until, for example, the supply of electric power is stopped.

In step S21, the transmission operation controller 78 determines whether the transmission operating unit 82 has been operated. In a case where the transmission operating unit 82 has been operated, the transmission operation controller 78 proceeds to step S22. In a case where the transmission operating unit 82 has not been operated, the transmission operation controller 78 ends the process of FIG. 5.

In step S22, the transmission operation controller 78 determines whether the communication control state is the first communication control state. In a case where the transmission operation controller 78 is configured to receive the present communication control state from the transmission controller 70, the transmission operation controller 78, for example, determines the communication control state based on the present communication control state received from the transmission controller 70. In a case where the operation input unit 76 is provided on at least one of a personal computer, a tablet-type computer, and a smartphone, the transmission operation controller 78 can be configured to receive the present communication control state from the operation input unit 76. In a case where the transmission operating unit 82 includes a switching operating portion, the transmission operation controller 78, for example, determines the communication control state based on an operation performed on the switching operating portion. In a case where the communication control state is the first communication control state, the transmission operation controller 78 proceeds to step S23. In step S23, the transmission operation controller 78 transmits the first command using the first communication protocol and then ends the process of FIG. 5. The transmission operation controller 78 has the transmission operation communicator 84 transmit the first command to the assist operation device 44 using the first communication protocol.

In a case where the communication control state is not the first communication control state in step S22, the transmission operation controller 78 proceeds to step S24. In step S24, the transmission operation controller 78 transmits the second shift command using the second communication protocol and then ends the process of FIG. 5. The transmission operation controller 78 has the transmission operation communicator 84 transmit the second command to the transmission device 62 using the second communication protocol.

Figure 6:
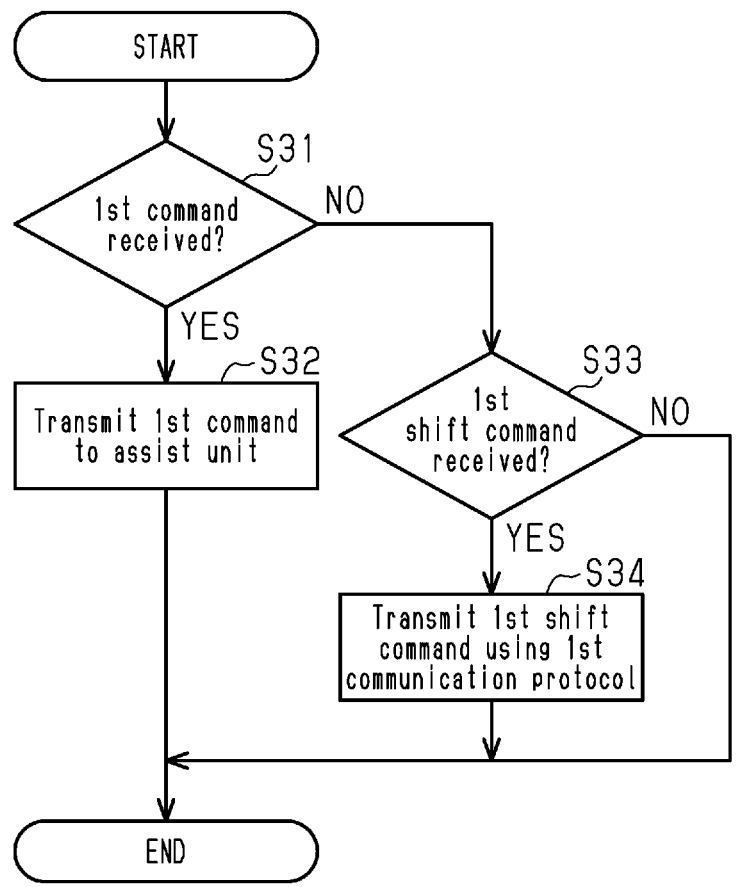
FIG. 6 is a flowchart of a process for controlling an assist operation device executed by an assist operation controller illustrated in FIG. 2.

With reference to FIG. 6, a process executed by the assist operation controller 54 to control the assist operation device 44 will now be described. In a case where, for example, the assist operation controller 54 is supplied with electric power, the assist operation controller 54 starts the process and proceeds to step S31 of the flowchart illustrated in FIG. 6. Upon completion of the flowchart illustrated in FIG. 6, the assist operation controller 54 repeats the process from step S31 in predetermined cycles until, for example, the supply of electric power is stopped.

In step S31, the assist operation controller 54 determines whether the first command has been received. The assist operation controller 54 determines that the first command has been received in a case where the assist operation communicator 58 receives the first command. In a case where the first command is received, the assist operation controller 54 proceeds to step S32. In step S32, the assist operation controller 54 transmits the first command to the assist unit 42 and then ends the process of FIG. 6.

In a case where the first command is not received in step S31, the assist operation controller 54 proceeds to step S33. In step S33, the assist operation controller 54 determines whether the first shift command has been received. In a case where the first shift command has been received, the assist operation controller 54 proceeds to step S34. In a case where the first shift command has not received in step S33, the assist operation controller 54 ends the process of FIG. 6.

In step S34, the assist operation controller 54 transmits the first shift command using the first communication protocol and then ends the process of FIG. 6. The assist operation controller 54 transmits the first shift command using the first communication protocol from the assist operation communicator 58 in step S34.

Figure 7:
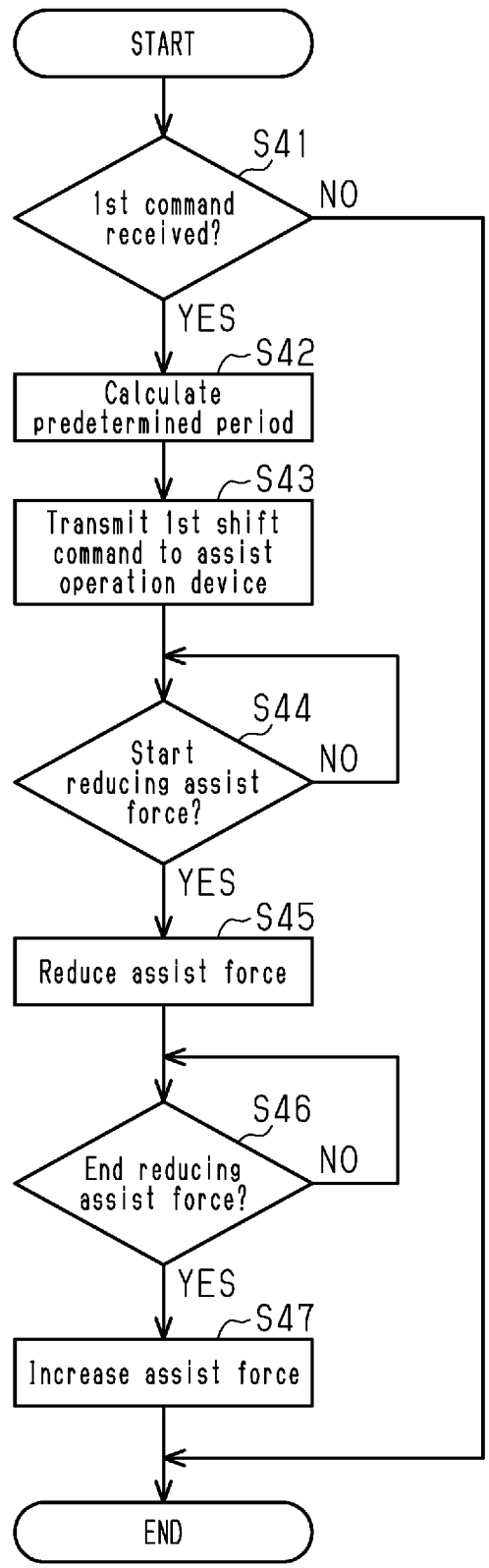
FIG. 7 is a flowchart of a process for controlling an assist device executed by an assist controller illustrated in FIG. 2.

With reference to FIG. 7, a process executed by the assist controller 48 to control the assist unit 42 will now be described. In a case where, for example, the assist controller 48 is supplied with electric power, the assist controller 48 starts the process and proceeds to step S41 of the flowchart illustrated in FIG. 7. Upon completion of the flowchart illustrated in FIG. 7, the assist controller 48 repeats the process from step S41 in predetermined cycles until, for example, the supply of electric power is stopped.

In step S41, the assist controller 48 determines whether the first command has been received. The assist controller 48 determines that the first command has been received in a case where the first command is received from the assist operation device 44. In a case where the first command is received, the assist controller 48 proceeds to step S42. In a case where the first command is not received in step S41, the assist controller 48 ends the process of FIG. 7.

In step S42, the assist controller 48 calculates the predetermined period based on the first signal and then proceeds to step S43. In step S43, the assist controller 48 transmits the first shift command to the assist operation device 44 and then proceeds to step S44.

In step S44, the assist controller 48 determines whether to start reducing the assist force. The assist controller 48, for example, determines to start reducing the assist force when the present time is the initiation time of the reduction period. In a case where the assist controller 48 does not determine to start reducing the assist force, step S44 is repeated until the assist controller 48 determines to start reducing the assist force. In a case where the assist controller 48 determines to start reducing the assist force, the assist controller 48 proceeds to step S45. In step S45, the assist controller 48 reduces the assist force and then proceeds to step S46.

In step S46, the assist controller 48 determines whether to end reducing the assist force. The assist controller 48, for example, determines to end reducing the assist force when the present time is the termination time of the reduction period. In a case where the assist controller 48 does not determine to end reducing the assist force, step S46 is repeated until the assist controller 48 determines to end reducing the assist force. In a case the assist controller 48 determines to end reducing the assist force, the assist controller 48 proceeds to step S47. In step S47, the assist controller 48 increases the assist force and then ends the process of FIG. 7. The assist controller 48, for example, changes the assist force of the assist unit 42 in step S47 to the assist force prior to step S45.

Figure 8:
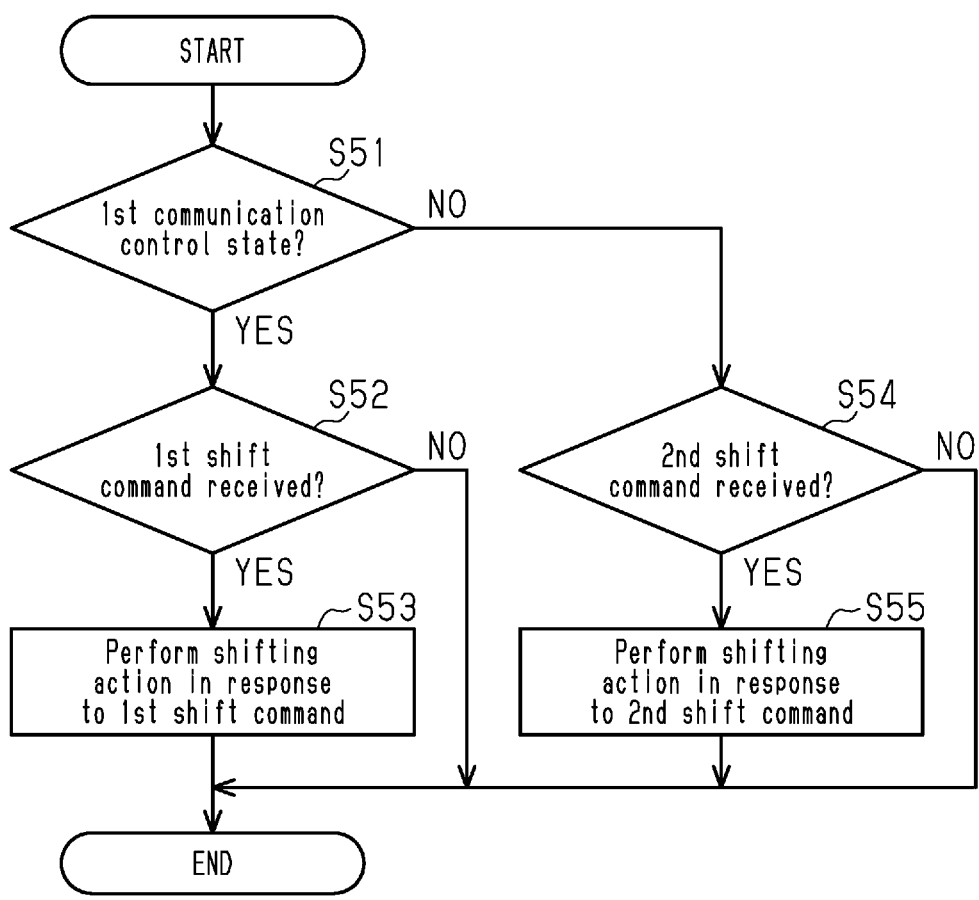
FIG. 8 is a flowchart of a process for controlling a transmission device executed by the transmission controller illustrated in FIG. 2.

With reference to FIG. 8, a process in which the transmission controller 70 controls the transmission device 62 in the control system 60 will now be described. In a case where, for example, the transmission controller 70 is supplied with electric power, the transmission controller 70 starts the process and proceeds to step S51 of the flowchart illustrated in FIG. 8. Upon completion of the flowchart illustrated in FIG. 8, the transmission controller 70 repeats the process from step S51 in predetermined cycles until, for example, the supply of electric power is stopped.

In step S51, the transmission controller 70 determines whether the communication control state is the first communication control state. In a case where the communication control state is the first communication control state, the transmission controller 70 proceeds to step S52.

In step S52, the transmission controller 70 determines whether the first shift command has been received. In a case where the first shift command has been received, the transmission controller 70 proceeds to step S53. In a case where the first shift command has not been received, the transmission controller 70 ends the process of FIG. 8. In step S53, the transmission controller 70 performs a shifting action in response to the first shift command and then ends the process of FIG. 8.

In a case where the communication control state is not the first communication control state in step S51, the transmission controller 70 proceeds to step S54. In step S54, the transmission controller 70 determines whether a second shift command has been received. In a case where the second shift command has been received, the transmission controller 70 proceeds to step S55. In a case where the second shift command has not been received, the transmission controller 70 ends the process of FIG. 8. In step S55, the transmission controller 70 performs a shifting action in response to the second shift command and then ends the process of FIG. 8.

In the control system 60, the assist unit 42 generates the first shift command. This allows the transmission device 62 to perform a shifting action in correspondence with the reduction period of the assist force of the assist unit 42. With the control system 60, the transmission device 62 can perform a shifting action during the period in which the assist force of the assist unit 42 is reduced even though the shifting action of the transmission device 62 is performed independently from the assist force control of the assist unit 42.

In the control system 60, the assist operation device 44 relays the first command output from the transmission operation device 64 to the assist unit 42. The assist operation device 44 is incorporated in the top tube 16B. Thus, the distance from the transmission device 62 to the assist operation device 44 is shorter than the distance from the transmission operation device 64 to the assist unit 42. By relaying the first command to the assist unit 42, the reliability of communication between the transmission operation device 64 and the assist unit 42 can be improved. This further ensures that the transmission device 62 will perform a shifting action in accordance with the action of the assist unit 42.

The transmission device 62 receives a shift command using the first communication protocol and the second communication protocol. The transmission device 62 can switch the communication control state in order to select one of the first communication protocol and the second communication protocol. Thus, even if the transmission device 62 does not communicate with the assist unit 42 and the assist operation device 44, a shifting action can be performed in accordance with a second shift command. As a result, the transmission device 62 improves the usability.

Modified Examples

The description related to the above embodiment exemplifies, without any intention to limit, applicable forms of a control system for a human-powered vehicle and a transmission device for a human-powered vehicle according to the present disclosure. The control system for a human-powered vehicle and the transmission device for a human-powered vehicle according to the present disclosure are applicable to, for example, modified examples of the above embodiment that are described below and combinations of at least two of the modified examples that are consistent with each other. In the modified examples described hereinafter, same reference numerals are given to those elements that are the same as the corresponding elements of the above embodiment. Such elements will not be described in detail.

At least one of the transmission device 62 and the transmission operation device 64 does not have to include a configuration for performing wireless communication using the second communication protocol. The transmission device 62, for example, includes the first communicator 66A and does not include the second communicator 66B. The transmission device 62, for example, is configured to perform wireless communication with the assist operation device 44 using the first communication protocol, and the configuration for performing wireless communication using the second communication protocol is omitted. In this modified example, for instance, the process of FIG. 4 is not executed. In this modified example, for instance, steps S22 and step S24 of FIG. 5, and steps S51, S54, and S55 of FIG. 8 are omitted.

In the first communication control state, the transmission controller 70 can control the communicator 66 so that the second communicator 66B is allowed to receive the second shift command. In the first communication control state, the transmission controller 70 can control the actuator 68 so that even if the second shift command is received, the actuator 68 will not perform a shifting action in response to the second shift command.

In the second communication state, the transmission controller 70 can control the communicator 66 so that the first communicator 66A is allowed to receive the first shift command. In the second communication control state, the transmission controller 70 can control the actuator 68 so that even if the first shift command is received, the actuator 68 will not perform a shifting action in response to the first shift command.

The assist unit 42 can include a current sensor that detects the current flowing through the inverter circuit. The current sensor is, for example, connected to the assist controller 48 in a manner allowing for wired or wireless communication. The assist controller 48 can calculate the predetermined period from the current detected by the current sensor.

The second communicator 66B can be integrated with the first communicator 66A as long as the second communication protocol differs from the first communication protocol. The communicator 66 of this modified example includes, for example, an antenna configured to switch frequencies between the first communication protocol and the second communication protocol.

The second communication protocol can be wired communication. The second communication protocol is, for example, power line communication (PLC) or UART.

The first shift command does not have to include information related to the shifting initiation time. The assist controller 48 is, for example, configured to transmit the first shift command to the transmission device 62 via the transmission operation device 64 in a case where the present time is the shifting initiation time. In the modified example, the transmission device 62 initiates a shifting action upon receipt of the first shift command. The assist controller 48 is, for example, configured to immediately transmit, upon receipt of the first command, the first shift command to the transmission device 62 via the transmission operation device 64. In a case where the assist controller 48 is configured to immediately transmit, upon receipt of the first command, the first shift command to the transmission device 62 via the transmission operation device 64, the assist controller 48 can immediately start reducing the assist force.

The first shift command does not have to include information related to the actuation time of the actuator 68. For example, in a case where the present time is the time for completing actuation of the actuator 68, the assist controller 48 is configured to transmit a termination command for de-actuating the actuator 68 to the transmission device 62 via the transmission operation device 64. In this modified example, the transmission device 62 de-actuates the actuator 68 upon receipt of the termination signal.

Upon receipt of the first shift command, the assist operation controller 54 can, for example, wait until the shifting initiation time before transmitting the first shift command to the transmission device 62. The assist operation controller 54 is, for example, configured to transmit the first shift command to the transmission device 62 after the first shift command is received at the shifting initiation time. In the modified example, the transmission device 62 initiates a shifting action upon receipt of the first shift command.

The assist operation device 44 can be omitted from the control system 60. The assist unit 42 of this modified example receives the first command from the transmission operation device 64. The assist unit 42 can be configured to transmit a first shift command to the transmission operation device 64 in response to the first command received from the transmission operation device 64. The assist controller 48 is configured to have the transmission operation device 64 transmit the first shift command to the transmission device 62 in response to the first command from the transmission operation device 64.

The control system 60 includes the transmission device 62 and the transmission operation device 64 that operates the transmission device 62. The transmission operation device 64 includes the transmission operation controller 78 configured to transmit the first command to the assist operation device 44 through wireless communication. The transmission device 62 includes the first communicator 66A that receives the first shift command transmitted from the assist operation device 44 upon receipt of the first command signal by the assist operation device 44, the actuator 68 that performs a shifting action, and the transmission controller 70 that controls the actuator 68 so that the actuator 68 performs a shifting action in response to the first shift command. As long as the control system 60 includes these elements, other elements can be omitted.

Figure 9:
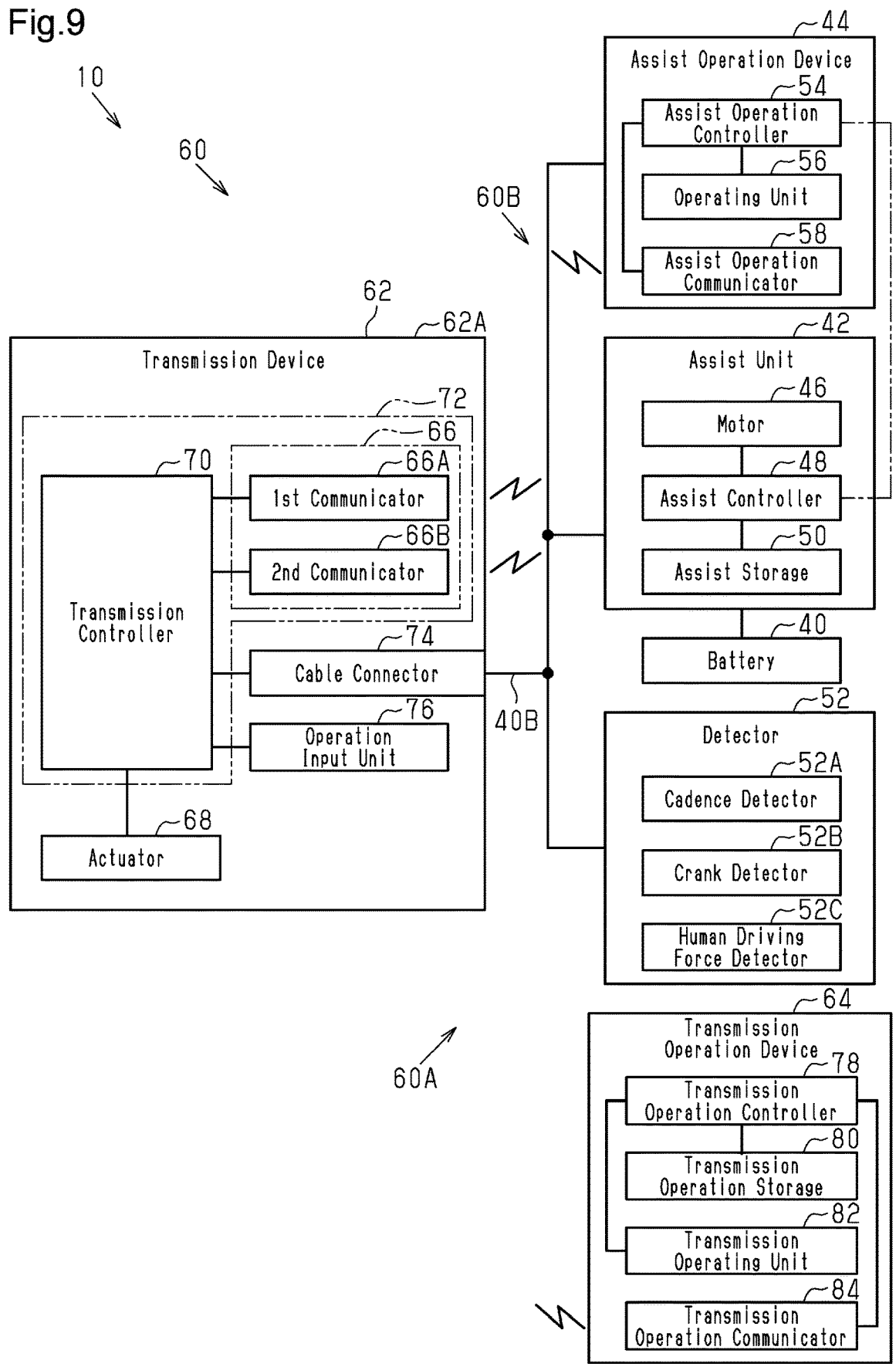
FIG. 9 is a block diagram showing the electrical configuration of a human-powered vehicle in a modified example.

The transmission device 62 can be supplied with electric power from the battery 40 via the assist unit 42. In a case where the transmission device 62 is supplied with electric power from the battery 40 via the assist unit 42, as shown in FIG. 9, the transmission device 62 can be connected by a power cable 40B to the assist unit 42. In this modified example, the power cable 40A can be omitted. In this modified example, the transmission device 62 is supplied with the electric power of the battery 40 via the assist unit 42 by the power cable 40B. The power cable 40B can electrically connect the assist unit 42 and the assist operation device 44 and the detector 52. In this modified example, the assist unit 42 can be connected to the battery 40 by an electric cable. Alternatively, the assist unit 42 can be connected to the battery 40 by electric terminals without using an electric cable. The cable connector 74 is this modified example is configured to be connected to the power cable 40B. The transmission controller 70 of this modified example can change the communication control state in accordance with the connection state of the power cable 40B and the cable connector 74.

The control system 60 includes the assist unit 42 that assists in propulsion of the human-powered vehicle 10 and the assist operation device 44 that includes the operating unit 56. The assist operation device 44 is configured to transmit an operation signal to the assist unit 42 through wired communication in a case where the operating unit 56 is operated by a user. The assist operation device 44 is configured to transmit a first command to the assist unit 42. The first command is received from the transmission operation device 64 that operates the transmission device 62. The assist unit 42 includes the assist controller 48 configured to have the assist operation device 44 transmit a first shift command to the transmission device 62 in response to receipt of the first command from the assist operation device 44 so that the transmission device 62 performs a shifting action. As long as the control system 60 includes these elements, other elements can be omitted.

The transmission device 62 includes the communicator 66, which serves as a communication unit, configured to communicate with the assist operation device 44 and the transmission operation device. The assist operation device 44 is configured to operate the assist unit 42 that assists in propulsion of the human-powered vehicle 10. The transmission operation device 64 is configured to operate the transmission device 62. The transmission device 62 further includes the transmission controller 70 configured to control the communicator 66 in accordance with the communication control state. The transmission controller 70 is configured to allow the communication control state to be switched from one of the first communication control state and the second communication control state to the other one of the first communication control state and the second communication control state. The transmission controller 70 is configured to control the communicator 66 so that the communicator 66 communicates with the assist operation device 44 using the first communication protocol in the first communication control state. The transmission controller 70 is configured to control the communicator 66 so that the communicator 66 communicates with the transmission operation device 64 using the second communication protocol in the second communication control state. The second communication control state differs from the first communication control state. As long as the transmission device 62 includes these elements, other elements can be omitted.

A control system in accordance with a first aspect of the present disclosure is for a human-powered vehicle. The human-powered vehicle includes an assist unit and an assist operation device. The assist unit is configured to assist in propulsion of the human-powered vehicle. The assist operation device includes an operating unit. The assist operation device is configured to transmit an operation signal to the assist unit through wired communication in a case where the operating unit is operated by a user. The control system comprises a transmission device and a transmission operation device configured to operate the transmission device. The transmission operation device includes a transmission operation controller configured to transmit a first command to the assist operation device through wireless communication. The transmission device includes a first communication unit, an actuator, and a transmission controller. The first communication unit is configured to receive a first shift command transmitted from the assist operation device in a case where the assist operation device receives the first command. The actuator is configured to perform a shifting action. The transmission controller is configured to control the actuator so that the actuator performs the shifting action in response to the first shift command.

With the control system in accordance with the first aspect, a shifting action of the transmission device is performed in response to a first shift command transmitted from the assist operation device. This allows the assist operation device to recognize the shifting action. Thus, the control system can control the transmission device in a preferred manner.

In accordance with a second aspect of the present disclosure, in the control system according to the first aspect, the transmission controller is configured to control the actuator so that the actuator initiates the shifting action in response to receipt of the first shift command by the first communication unit.

With the control system of the second aspect, the transmission device can initiate a shifting action without communication being established between the transmission device and the transmission operation device.

In accordance with a third aspect of the present disclosure, in the control system according to the first or second aspect, the first communication unit is configured to receive the first shift command through wireless communication.

With the control system in accordance with the third aspect, the transmission device receives the first shift command from the assist operation device through wireless communication. This allows a communication line for the transmission device and the assist operation device to be omitted.

In accordance with a fourth aspect of the present disclosure, in the control system according to any one of the first to third aspects, the assist unit is configured to reduce assist force in response to the first command.

With the control system in accordance with the fourth aspect, the assist unit reduces assist force in response to the first command. This allows the transmission device to perform a shifting action in a preferred manner.

In accordance with a fifth aspect of the present disclosure, the control system according to any one of the first to fourth aspects is configured so that in a case where the assist operation device receives the first command, the first shift command is transmitted from the assist operation device according to a predetermined period.

With the control system in accordance with the fifth aspect, in a case where the assist operation device receives the first command, the first shift command is transmitted from the assist operation device according to a predetermined period. This allows the transmission device to perform a shifting action based on the predetermined period.

In accordance with a sixth aspect of the present disclosure, the control system according to the fifth aspect is configured so that the predetermined period is based on at least one of cadence of the human-powered vehicle and crank angle of a crank of the human-powered vehicle.

With the control system in accordance with the sixth aspect, the predetermined period can be set based on at least one of cadence of the human-powered vehicle and crank angle of the crank of the human-powered vehicle.

In accordance with a seventh aspect of the present disclosure, the control system according to the fifth or sixth aspect is configured so that the predetermined period corresponds to a period in which assist force of the assist unit is reduced in response to the first command.

With the control system in accordance with the seventh aspect, the transmission device can perform a shifting action during the period in which the assist unit reduces assist force in response to the first command.

In accordance with an eighth aspect of the present disclosure, in the control system according to any one of the fifth to seventh aspects, the assist unit includes an assist controller configured to calculate the predetermined period based on an output of a detector.

With the control system in accordance with the eighth aspect, the assist unit can calculate the predetermined period based on a parameter of the human-powered vehicle detected by the detector.

In accordance with a ninth aspect of the present disclosure, in the control system according to any one of the first to eight aspects, the transmission operation device is configured to transmit a second shift command to the transmission device through wireless communication, and the transmission device includes a second communication unit configured to receive the second shift command through wireless communication.

With the control system in accordance with the ninth aspect, a second shift command is transmitted from the transmission operation device to the transmission device. This allows the transmission device to perform a shifting action even if a first shift command is not received from the assist operation device.

In accordance with a tenth aspect of the present disclosure, the control system according to the ninth aspect is configured so that the first communication unit communicates with the assist operation device using a first communication protocol. The second communication unit communicates with the transmission operation device using a second communication protocol. The second communication protocol differs from the first communication protocol.

With the control system in accordance with the tenth aspect, the transmission device communicates with the assist operation device and the transmission operation device using different communication protocols.

In accordance with an eleventh aspect of the present disclosure, in the control system according to the tenth aspect, the transmission controller is configured to control the first communication unit and the second communication unit in accordance with a communication control state. The transmission controller is configured to allow the communication control state to be switched from one of a first communication control state and a second communication control state to the other one of the first communication control state and the second communication control state. The transmission controller is configured to control the first communication unit so that the first communication unit communicates with the assist operation device using the first communication protocol in the first communication control state. The transmission controller is configured to control the second communication unit so that the second communication unit communicates with the transmission operation device using the second communication protocol in the second communication control state.

With the control system in accordance with the eleventh aspect, the transmission device switches the communication control state to communicate with one of the assist operation device and the transmission operation device.

In accordance with a twelfth aspect of the present disclosure, in the control system according to the tenth or eleventh aspect, the transmission operation device is configured to communicate with the assist operation device using the first communication protocol.

With the control system in accordance with the twelfth aspect, the transmission device and the transmission operation device both communicate with the assist operation device using the first communication protocol.

In accordance with a thirteenth aspect of the present disclosure, the control system according to any one of the first to twelfth aspects is configured so that the first communication protocol is wireless communication using a wireless signal of a first frequency, the second communication protocol is wireless communication using a wireless signal of a second frequency, and the second frequency differs from the first frequency.

With the control system in accordance with the thirteenth aspect, the transmission device communicates with the assist operation device and the transmission operation device using different frequencies.

In accordance with a fourteenth aspect of the present disclosure, in the control system according to any one of the first to thirteenth aspects, the transmission device further includes a cable connector configured to be connected to a power cable, the power cable is configured to be connected to a battery, and the battery is configured to supply electric power to the assist unit and the transmission device.

With the control system in accordance with the fourteenth aspect, the transmission device is actuated by electric power supplied from the battery that also supplies electric power to the assist unit.

In accordance with a fifteenth aspect of the present disclosure, the control system according to any one of the first to fourteenth aspects further comprises the assist unit and the assist operation device.

With the control system in accordance with the fifteenth aspect that further includes the assist unit and the assist operation device, the transmission device can be controlled in a preferred manner.

A control system in accordance with a sixteenth aspect of the present disclosure is for a human-powered vehicle. The control system comprises an assist unit configured to assist in propulsion of the human-powered vehicle, and an assist operation device including an operating unit. The assist operation device is configured to transmit an operation signal to the assist unit through wired communication in a case where the operating unit is operated by a user. The assist operation device is configured to transmit a first command to the assist unit. The first command is received from a transmission operation device that operates a transmission device. The assist unit includes an assist controller configured to have the assist operation device transmit a first shift command to the transmission device in response to receipt of the first command from the assist operation device so that the transmission device performs a shifting action.

With the control system in accordance with the sixteenth aspect, the assist unit transmits a first shift command to the assist operation device. This allows the assist operation device to recognize a shifting action of the transmission device. Thus, the control system can control the transmission device in a preferred manner.

A transmission device in accordance with a seventeenth aspect is for a human-powered vehicle. The transmission device comprises a communication unit configured to communicate with an assist operation device and a transmission operation device. The assist operation device is configured to operate an assist unit assisting in propulsion of the human-powered vehicle. The transmission operation device is configured to operate the transmission device. The transmission device further comprises a transmission controller configured to control the communication unit in accordance with a communication control state. The transmission controller is configured to allow the communication control state to be switched from one of a first communication control state and a second communication control state to the other one of the first communication control state and the second communication control state. The transmission controller is configured to control the communication unit so that the communication unit communicates with the assist operation device using a first communication protocol in the first communication control state. The transmission controller is configured to control the communication unit so that the communication unit communicates with the transmission operation device using a second communication protocol in the second communication control state. The second communication protocol differs from the first communication protocol.

With the transmission device in accordance with the seventeenth aspect, the transmission device switches the communication control state to communicate with one of the assist operation device and the transmission operation device. This allows the transmission device to perform a shifting action without communicating with the other one of the assist operation device and the transmission operation device. Thus, the transmission device can be controlled in a preferred manner.

In accordance with an eighteenth aspect of the present disclosure, the transmission device according to the seventeenth aspect is configured so that the first communication protocol is wireless communication using a wireless signal of a first frequency, the second communication protocol is wireless communication using a wireless signal of a second frequency, and the second frequency differs from the first frequency.

With the transmission device in accordance with the eighteenth aspect, the transmission device can communicate with the assist operation device and the transmission operation device using different frequencies.

In accordance with a nineteenth aspect of the present disclosure, the transmission device according to the seventeenth or eighteenth aspect is configured so that the communication unit includes a first communication unit configured to receive a first shift command transmitted from the assist operation device through wireless communication using the first communication protocol, and the communication unit includes a second communication unit configured to receive a second shift command transmitted from the transmission operation device through wireless communication using the second communication protocol.

With the transmission device in accordance with the nineteenth aspect, the communication unit that is used is switched to allow the communication control state to be switched from one of the first communication control state and the second communication control state to the other one of the first communication control state and the second communication control state.

In accordance with a twentieth aspect of the present disclosure, the transmission device according to any one of the seventeenth to nineteenth aspects further comprises a substrate on which the first communication unit and the second communication unit are mounted.

With the transmission device in accordance with the twentieth aspect, the first communication unit and the second communication unit can be mounted on the same substrate.

In accordance with a twenty-first aspect of the present disclosure, the transmission device according to any one of the seventeenth to twentieth aspects is configured so that the assist operation device includes an operating unit, and the assist operation device is configured to transmit an operation signal to the assist unit through wired communication in response to operation of the operating unit by a user.

With the transmission device in accordance with the twenty-first aspect, the assist unit can be controlled in a preferred manner in accordance with the operating unit.

The control system for a human-powered vehicle and the transmission device for a human-powered vehicle in accordance with the present disclosure allow the transmission device to be controlled in a preferred manner.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The terms "a" (or "an"), "one or more" and "at least one" can be used interchangeably herein.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

Obviously, numerous modifications and variations of the present invention are possible in light of the above teachings. It is therefore to be understood that within the scope of the appended claims, the invention may be practiced otherwise than as specifically described herein.

What is claimed is:

1. A human-powered vehicle control system comprising:
   a transmission device;
   a transmission operation device configured to operate the transmission device;
   the transmission operation device including transmission operation controller circuitry configured to transmit a first command to an assist operation device of a human-powered vehicle through wireless communication, the human-powered vehicle including an assist unit and the assist operation device, the assist unit being configured to assist in propulsion of the human-powered vehicle, the assist operation device including an operating unit, the assist operation device being configured to transmit an operation signal to the assist unit through wired communication in a case where the operating unit is operated by a user;
   the transmission device including first communicator circuitry, an actuator, and transmission controller circuitry, the first communicator circuitry being configured to receive a first shift command transmitted from the assist operation device in a case where the assist operation device receives the first command;
   the actuator being configured to perform a shifting action; and
   the transmission controller circuitry being configured to control the actuator so that the actuator performs the shifting action in response to the first shift command.

2. The human-powered vehicle control system according to claim 1, wherein
   the transmission controller circuitry is configured to control the actuator so that the actuator initiates the shifting action in response to receipt of the first shift command by the first communicator circuitry.

3. The human-powered vehicle control system according to claim 1, wherein
   the first communicator circuitry is configured to receive the first shift command through wireless communication.

4. The human-powered vehicle control system according to claim 1, wherein
   the assist unit is configured to reduce assist force in response to the first command.

5. The human-powered vehicle control system according to claim 1, wherein
   in a case where the assist operation device receives the first command, the first shift command is transmitted from the assist operation device according to a predetermined period.

6. The human-powered vehicle control system according to claim 5, wherein
   the predetermined period is based on at least one of a cadence of the human-powered vehicle and a crank angle of a crank of the human-powered vehicle.

7. The human-powered vehicle control system according to claim 5, wherein
   the predetermined period corresponds to a period in which assist force of the assist unit is reduced in response to the first command.

8. The human-powered vehicle control system according to claim 5, wherein
   the assist unit includes assist controller circuitry configured to calculate the predetermined period based on an output of a detector.

9. The human-powered vehicle control system according to claim 1, wherein:
   the transmission operation device is configured to transmit a second shift command to the transmission device through wireless communication; and
   the transmission device includes second communicator circuitry configured to receive the second shift command through wireless communication.

10. The human-powered vehicle control system according to claim 9, wherein:
    the first communicator circuitry is configured to communicate with the assist operation device using a first communication protocol;
    the second communicator circuitry is configured to communicate with the transmission operation device using a second communication protocol; and
    the second communication protocol differs from the first communication protocol.

11. The human-powered vehicle control system according to claim 10, wherein:
    the transmission controller circuitry is configured to control the first communicator circuitry and the second communicator circuitry in accordance with a communication control state;

the transmission controller circuitry is configured to allow the communication control state to be switched from one of a first communication control state and a second communication control state to another of the first communication control state and the second communication control state;

the transmission controller circuitry is configured to control the first communicator circuitry so that the first communicator circuitry communicates with the assist operation device using the first communication protocol in the first communication control state; and the transmission controller circuitry is configured to control the second communicator circuitry so that the second communicator circuitry communicates with the transmission operation device using the second communication protocol in the second communication control state.

12. The human-powered vehicle control system according to claim 10, wherein
the transmission operation device is configured to communicate with the assist operation device using the first communication protocol.

13. The human-powered vehicle control system according to claim 10, wherein:
the first communication protocol includes wireless communication using a wireless signal of a first frequency;
the second communication protocol includes wireless communication using a wireless signal of a second frequency; and
the second frequency differs from the first frequency.

14. The human-powered vehicle control system according to claim 1, wherein:
the transmission device further includes a cable connector configured to be connected to a power cable;
the power cable is configured to be connected to a battery; and
the battery is configured to supply electric power to the assist unit and the transmission device.

15. A human-powered vehicle control system comprising:
an assist unit configured to assist in propulsion of a human-powered vehicle;
an assist operation device including an operating unit, the assist operation device being configured to transmit an operation signal to the assist unit through wired communication in a case where the operating unit is operated by a user;
the assist operation device being configured to transmit a first command to the assist unit, the first command being received from a transmission operation device configured to operate a transmission device; and
the assist unit including assist controller circuitry configured to have the assist operation device transmit a first shift command to the transmission device in response to receipt of the first command from the assist operation device so that the transmission device performs a shifting action.

16. A human-powered vehicle transmission device comprising:
communicator circuitry configured to communicate with an assist operation device and a transmission operation device, the assist operation device being configured to operate an assist unit configured to assist in propulsion of a human-powered vehicle, the transmission operation device being configured to operate the transmission device;

transmission controller circuitry configured to control the communicator circuitry in accordance with a communication control state;

the transmission controller circuitry being configured to allow the communication control state to be switched from one of a first communication control state and a second communication control state to another of the first communication control state and the second communication control state;

the transmission controller circuitry being configured to control the communicator circuitry so that the communicator circuitry communicates with the assist operation device using a first communication protocol in the first communication control state; and the transmission controller circuitry being configured to control the communicator circuitry so that the communicator circuitry communicates with the transmission operation device using a second communication protocol in the second communication control state, the second communication protocol differing from the first communication protocol.

17. The human-powered vehicle transmission device according to claim 16, wherein:
the first communication protocol includes wireless communication using a wireless signal of a first frequency;
the second communication protocol includes wireless communication using a wireless signal of a second frequency; and
the second frequency differs from the first frequency.

18. The human-powered vehicle transmission device according to claim 16, wherein:
the communicator circuitry includes first communicator circuitry configured to receive a first shift command transmitted from the assist operation device through wireless communication using the first communication protocol; and
the communicator circuitry includes second communicator circuitry configured to receive a second shift command transmitted from the transmission operation device through wireless communication using the second communication protocol.

19. The human-powered vehicle transmission device according to claim 18, further comprising
a substrate on which the first communicator circuitry and the second communicator circuitry are mounted.

20. The human-powered vehicle transmission device according to claim 16, wherein:
the assist operation device includes an operating unit; and
the assist operation device is configured to transmit an operation signal to the assist unit through wired communication in response to operation of the operating unit by a user.

* * * * *